(12) United States Patent
Sonoda et al.

(10) Patent No.: US 8,856,334 B2
(45) Date of Patent: Oct. 7, 2014

(54) RESOURCE LENDING CONTROL APPARATUS AND RESOURCE LENDING METHOD

(75) Inventors: Masataka Sonoda, Kawasaki (JP);
Motomitsu Adachi, Kawasaki (JP);
Yukihiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 12/793,272

(22) Filed: Jun. 3, 2010

(65) Prior Publication Data
US 2010/0241751 A1 Sep. 23, 2010

Related U.S. Application Data

(63) Continuation of application No. PCT/JP2007/073410, filed on Dec. 4, 2007.

(51) Int. Cl.
*G06F 15/173* (2006.01)
*H04L 29/08* (2006.01)
*H04L 29/06* (2006.01)
*G06Q 40/02* (2012.01)
*G06Q 40/00* (2012.01)

(52) U.S. Cl.
CPC ......... *G06F 15/173* (2013.01); *H04L 29/08144* (2013.01); *H04L 29/06* (2013.01); *H04L 29/08072* (2013.01); *H04L 29/0809* (2013.01); *G06Q 40/025* (2013.01); *G06Q 40/00* (2013.01); *G06Q 40/02* (2013.01)
USPC ........................................................ 709/226

(58) Field of Classification Search
CPC .............. H04L 29/08144; H04L 29/06; H04L 29/08072; G06Q 40/00
USPC ........................................................ 709/226
See application file for complete search history.

(56) References Cited

U.S. PATENT DOCUMENTS

| | | | | |
|---|---|---|---|---|
| 6,766,508 | B1 * | 7/2004 | Isham | 717/116 |
| 6,828,989 | B2 * | 12/2004 | Cortright | 715/769 |
| 7,058,629 | B1 * | 6/2006 | Colrain et al. | 710/200 |
| 7,065,618 | B1 * | 6/2006 | Ghemawat et al. | 711/161 |
| 7,418,624 | B2 * | 8/2008 | Ichikawa et al. | 714/5.11 |

(Continued)

FOREIGN PATENT DOCUMENTS

| | | |
|---|---|---|
| JP | 2004-326452 | 11/2004 |
| JP | 2005-141605 | 6/2005 |
| JP | 2007-114983 | 5/2007 |
| JP | 2007-133586 | 5/2007 |

*Primary Examiner* — Ondrej Vostal
(74) *Attorney, Agent, or Firm* — Greer Burns & Crain Ltd.

(57) ABSTRACT

A resource lending control apparatus stores an assignment time and a deletion time in association with each other for each customer. The assignment time indicates a time for assigning an application used by each customer to provide a service to a server. The deletion time indicates a time for deleting the application from the server. The resource lending control apparatus calculates a lendable period of a remaining fixed resource of a lending customer by subtracting the deletion time and the assignment time of the lending customer from a remaining fixed period. The resource lending control apparatus calculates a total borrowing period, i.e., a period during which a borrowing customer is to use a borrowed resource, by adding the deletion time and the assignment time of the borrowing customer to a borrowing request period. Then, the resource lending control apparatus determines whether the calculated total borrowing period is covered by the calculated lendable period to determine to lend the remaining fixed resource.

6 Claims, 17 Drawing Sheets

(56) References Cited

U.S. PATENT DOCUMENTS

| | | |
|---|---|---|
| 7,424,449 B2 * | 9/2008 | Goel .......................... 705/26.7 |
| 7,464,165 B2 * | 12/2008 | Vo et al. ...................... 709/226 |
| 7,500,001 B2 * | 3/2009 | Tameshige et al. ........... 709/226 |
| 7,853,495 B2 * | 12/2010 | Kamada et al. ............... 705/32 |
| 2001/0000812 A1 * | 5/2001 | Waldo et al. ................. 709/225 |
| 2002/0194132 A1 * | 12/2002 | Pearson et al. ................. 705/52 |
| 2003/0093505 A1 * | 5/2003 | Waldo et al. ................. 709/220 |
| 2003/0125996 A1 * | 7/2003 | Bush et al. ...................... 705/7 |
| 2003/0233433 A1 * | 12/2003 | Halpern ....................... 709/222 |
| 2004/0078257 A1 * | 4/2004 | Schweitzer et al. ............. 705/9 |
| 2004/0199440 A1 * | 10/2004 | McDaniel, Jr. ................ 705/35 |
| 2004/0249663 A1 * | 12/2004 | Shishido ......................... 705/1 |
| 2005/0010517 A1 * | 1/2005 | Lowenstein et al. ........... 705/37 |
| 2005/0071265 A1 * | 3/2005 | Nishimaki ...................... 705/38 |
| 2005/0125521 A1 * | 6/2005 | Grimm et al. ................. 709/223 |
| 2005/0166179 A1 * | 7/2005 | Vronay et al. ................. 717/105 |
| 2005/0182671 A1 * | 8/2005 | Miyauchi ......................... 705/5 |
| 2005/0289388 A1 * | 12/2005 | Black-Ziegelbein et al. ..... 714/7 |
| 2006/0271964 A1 * | 11/2006 | Rodriguez et al. .............. 725/61 |
| 2007/0094396 A1 | 4/2007 | Takano et al. |
| 2007/0106796 A1 | 5/2007 | Kudo et al. |
| 2007/0192239 A1 * | 8/2007 | Karis et al. ..................... 705/38 |
| 2007/0226020 A1 * | 9/2007 | Park ................................. 705/5 |
| 2007/0244779 A1 * | 10/2007 | Wolff ............................. 705/35 |
| 2008/0091806 A1 * | 4/2008 | Shen et al. .................... 709/223 |
| 2008/0109549 A1 * | 5/2008 | Nakagawa et al. ........... 709/225 |

\* cited by examiner

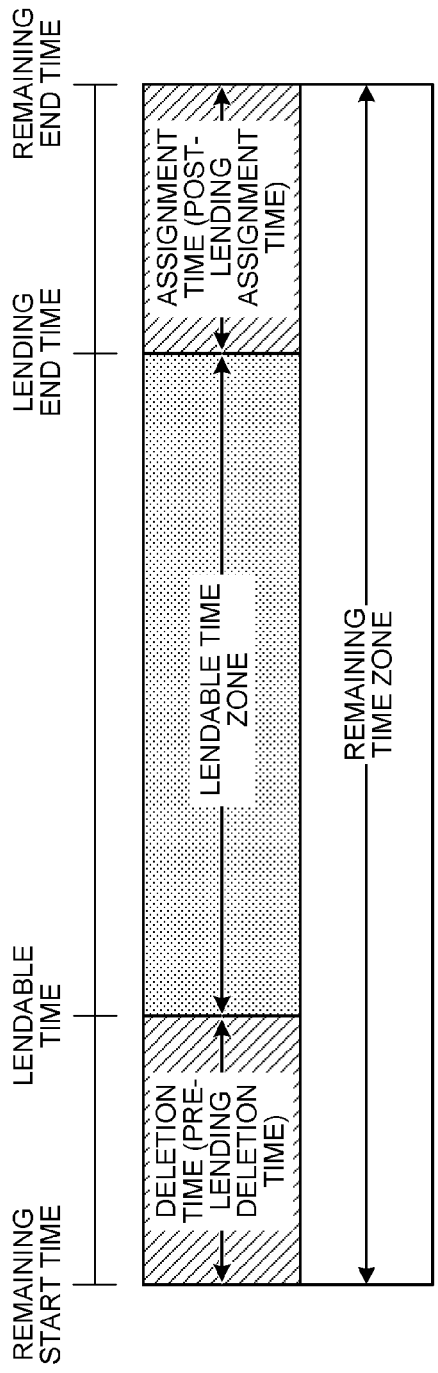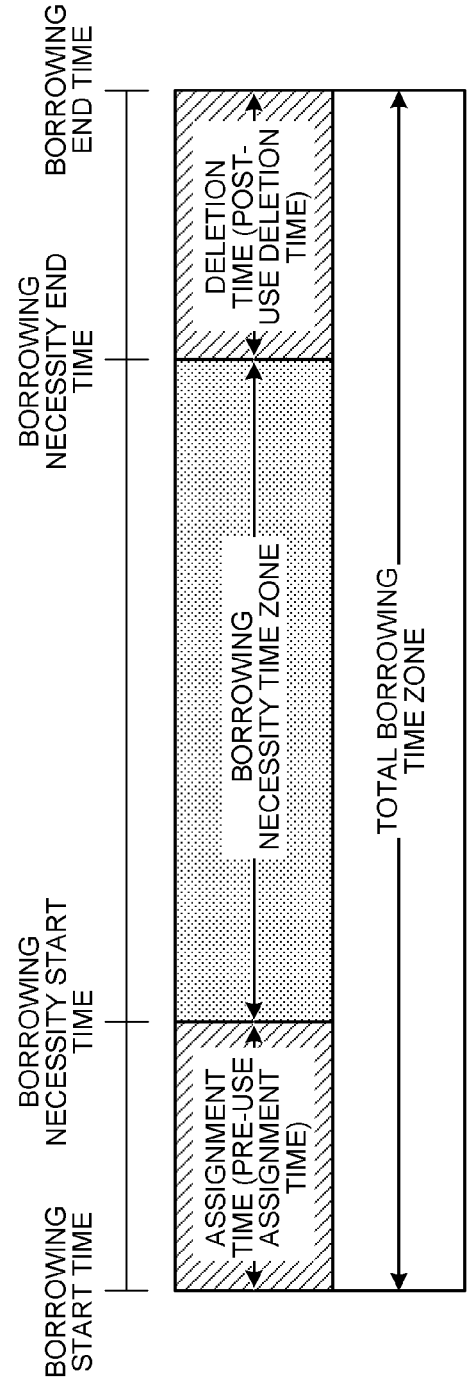

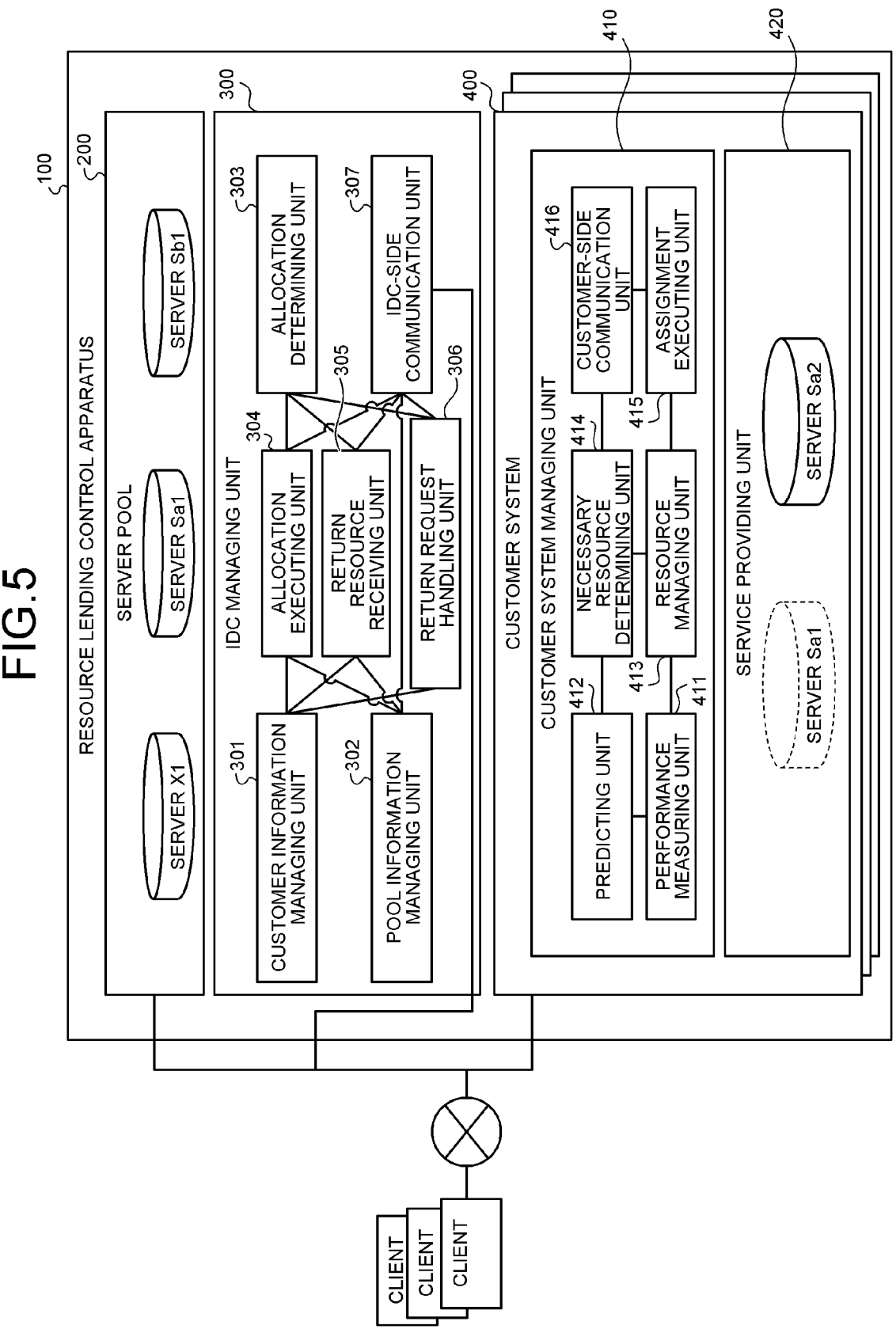

FIG.6

| SERVER | POSSESSOR | TYPE | RESOURCE AMOUNT | STATE | REMAINING TIME ZONE | | REMAINING TIME | ASSIGN-MENT TIME | DELETION TIME | LENDABLE TIME ZONE | | LENDABLE TIME |
|---|---|---|---|---|---|---|---|---|---|---|---|---|
| | | | | | REMAINING START TIME | REMAINING END TIME | | | | LENDING START TIME | LENDING END TIME | |
| Sa1 | CUSTOMER A | A | 1r | BEING USED | t1 | t5.5 | 4.5t | 1t | 1t | t2 | t4.5 | 2.5t |

FIG.7

| SERVER | POSSESSOR | TYPE | RESOURCE AMOUNT | STATE | REMAINING TIME ZONE | | REMAINING TIME | ASSIGN-MENT TIME | DELETION TIME | LENDABLE TIME ZONE | | LENDABLE TIME |
|---|---|---|---|---|---|---|---|---|---|---|---|---|
| | | | | | REMAINING START TIME | REMAINING END TIME | | | | LENDING START TIME | LENDING END TIME | |
| Sx1 | IDC | A | 1r | BEING USED | 0 | ∞ | ∞ | 0 | 0 | 0 | ∞ | ∞ |
| Sa1 | CUSTOMER A | A | 1r | BEING LENT | t1 | t5.5 | 4.5t | 1t | 1t | t2 | t4.5 | 2.5t |
| Sb2 | CUSTOMER B | A | 1r | BEING LENT | t1 | t6 | 5t | 1.5t | 1.5t | t2.5 | t4.5 | 2t |

FIG.12

| ID | REQUEST CUSTOMER | RESOURCE AMOUNT | BORROWING NECESSITY TIME ZONE | | BORROWING NECESSITY TIME | ASSIGN-MENT TIME | DELETION TIME | BORROWABLE TIME ZONE | | TOTAL BORROWING TIME |
|---|---|---|---|---|---|---|---|---|---|---|
| | | | BORROWING NECESSITY START TIME | BORROWING NECESSITY END TIME | | | | BORROWING START TIME | BORROWING END TIME | |
| ra | CUSTOMER A | 2r | t0 | t2 | 2t | 0.5t | 1t | t0 | t2.5 | 2.5t |
| rb | CUSTOMER B | 3r | t3 | t5 | 2t | 0.5t | 0.5t | t2.5 | t5.5 | 3t |
| rc | CUSTOMER C | 2r | t5 | t6 | 1t | 1t | 1t | t4 | t7 | 4t |

RESOURCE LENDING CONTROL APPARATUS AND RESOURCE LENDING METHOD

CROSS-REFERENCE TO RELATED APPLICATION(S)

This application is a continuation of International Application No. PCT/JP2007/073410, filed on Dec. 4, 2007, the entire contents of which are incorporated herein by reference.

FIELD

The embodiments discussed herein are directed to a resource lending control apparatus, a resource lending method, and a resource lending program.

BACKGROUND

In recent years, services using the Internet have continuously increased. In an operation system that manages these services, due to a characteristic of the Internet that it is "accessible at anytime at any place", a demand on the operation system for resources fluctuates widely. As a result, when resources (for example, server resources) of the operation system are prepared to meet a peak of demands (when the requirement amount is maximal), the capacity is in surplus in normal times (when the requirement amount is average), and a facility is wasted. Meanwhile, when resources of the operation system are prepared according to the normal requirement amount, there would not be a sufficient capacity at the peak of the demands. As a result, a business opportunity may be lost.

In order to solve the above problem, studies have been made on a utility computing (UC) technology (or Capacity on Demand (CoD) technology) for dynamically optimizing the resources of the operation system according to changing demand on the operation system.

A conventional UC technology will be described by way of example with reference to FIG. 18. FIG. 18 is a block diagram illustrating the conventional UC technology. As illustrated in FIG. 18, an Internet Data Center (hereinafter, simply referred to as IDC) using the UC technology includes an IDC managing device that manages the IDC using the UC technology (for example, allocates each server of the IDC to each customer device), a customer device (system of an IDC user) that is operated by each customer using the IDC, and a server pool that includes resources of the server managed by the IDC managing device and not allocated to any of the customer devices. Each of the customer devices includes a service providing unit that provides a service and a system managing unit that manages a system, and provides a service of each customer to an end user through a network.

Next, a relationship between the IDC, the IDC managing device, the customer, and the end user will be described. The IDC managing device provides resources of the IDC to each customer device. The IDC managing device offers each customer device resources for providing services (for example, the IDC managing device offers the customer device a server as a server for providing services, and the customer device also requests the IDC to manage the operation of the offered server itself), and the customer device provides a corresponding service of each customer to the end user. The end user is a user who receives the service provided by each customer. In actuality, the end user has access to the IDC (for example, server of the IDC) and receives the service of each customer.

The IDC managing device offers each customer device resources of servers in two different manners. Firstly, the IDC managing device offers the resources of the server as fixed resources. Here, the fixed resources are resources that are previously allocated to each customer device and provided thereto constantly. For example, in a common method, the amount of resources that are allocated as the fixed resources is determined according to a contract between each customer and the IDC, and the IDC managing device allocates the fixed resources to each customer set in advance constantly, even when the requirement amount (the amount of resources used by the end user in actuality) of the customer device is less than the fixed resources.

Secondly, the IDC managing device provides resources of the server as spare resources (on-demand resources). The spare resources are resources that are temporarily allocated to each resource-shortage customer device aside from the fixed resources; the resource-shortage customer device is a customer device for which the previously allocated fixed resource becomes temporarily insufficient. For example, when the requirement amount of each customer device increases or when the fixed resources previously allocated to each customer device become defective, and the customer device cannot operate only with the fixed resources, the spare resources is allocated in addition. In a common method, yet-allocated fixed resources are used as the spare resources; the yet-allocated fixed resources are resources of a server which have not been allocated to any of the customer devices as the fixed resources. The spare resources are allocated to each resource-shortage customer device by a required amount, when necessary, and are returned to a shared pool, when they become unnecessary.

For example, Japanese Laid-open Patent Publication No. 2004-326452 (refer to pages 1, 5, and 14 to 17 and FIG. 1) discloses a method according to which remaining fixed resources, that is, non-used resources among fixed resources allocated to each customer device are borrowed and lent between the customer devices.

Specifically, a customer (lending customer) who provides the remaining fixed resources to the IDC registers the remaining fixed resources it can lend in the IDC managing device. The IDC managing device receives a request from a customer (borrowing customer) who requests for the spare resources, and provides the lendable, remaining fixed resources of the lending customer to the borrowing customer. During this exchanging process, the borrowing customer pays a charge for using the spare resources (remaining fixed resources) and the lending customer receives a charge according to an actual record of the lent remaining fixed resources, from the IDC managing device.

According to the above-described conventional technology, however, the resources cannot be appropriately allocated as described below.

For example, the conventional technologies and Japanese Laid-open Patent Publication No. 2004-326452 do not disclose how to determine which resources among lendable resources are to be allocated to the borrowing customer when the borrowing customer makes a request for the spare resources, and hence the resources cannot be allocated efficiently.

Specifically, Japanese Laid-open Patent Publication No. 2004-326452 does not take into account a time for assigning an application to the resources of the server provided to each customer device for providing a service when the spare resources are lent. In addition, each borrowing customer may not be able to provide a service in a desirable time zone during which the borrowing customer wants to use the spare resources to provide a service, if using a time zone allocated by the IDC managing device to the borrowing customer.

In addition, in the conventional technologies, the lending customer cannot immediately receive the return of the lent fixed resources. For example, while the fixed resources is lent out, the lending customer may desire that the borrowing customer immediately return the lent fixed resources due to non-predictable, abrupt generation of load; however, the lending customer cannot receive the return of the fixed resources immediately.

SUMMARY

According to an aspect of an embodiment of the invention, an apparatus for controlling lending of a resource of one customer to another customer, the apparatus includes: a time information storage unit that stores an assignment time and a deletion time in association with each other for each of a plurality of customers who provides a service utilizing a resource of a server, the resource being allocated to each customer, the assignment time indicating a time for assigning an application used by each customer to provide a service to the server, and the deletion time indicating a time for deleting the application from the server; a lendable period calculating unit that calculates a lendable period of a remaining resource of a lending customer by subtracting the deletion time and the assignment time of the lending customer stored in the time information storage unit from a remaining period indicating a period during which the remaining resource is not used by the lending customer for providing the service, the remaining resource being a resource allocated to the customer but not used by the customer for providing the service, and the lendable period indicating a period during which the remaining resource can be lent; a total borrowing period calculating unit that calculates a total borrowing period by adding the deletion time and the assignment time of a borrowing customer stored in the time information storage unit to a borrowing request period, the total borrowing period indicating a period during which the borrowing customer is to borrow the remaining resource, the borrowing customer being a customer who wishes to borrow the resource, the borrowing request period indicating a period during which the borrowing customer is to provide the service using the borrowed resource; and a lending determining unit that determines whether the total borrowing period calculated by the total borrowing period calculating unit is covered by the lendable period calculated by the lendable period calculating unit to determine to lend the remaining resource to the borrowing customer.

According to another aspect of an embodiment of the invention, a method for controlling lending of a resource of one customer to another customer, the method includes: firstly calculating a lendable period of a remaining resource of a lending customer by subtracting an assignment time and a deletion time of the lending customer stored in association with each other in a time information storage unit from a remaining period of the remaining resource of the lending customer, the customer providing a service utilizing a resource of a server, the remaining resource being a resource allocated to each customer by not used by the customer to provide the service, the assignment time indicating a time for assigning an application used by each customer to provide a service to the server, the deletion time indicating a time for deleting the application from the server, the remaining period indicating a period during which the remaining resource is not used for providing the service, the lendable period indicating a period during which the remaining resource can be lent, the time information storage unit storing the assignment time and the deletion time of each customer in association with each other; secondly calculating a total borrowing period by adding the deletion time and the assignment time of a borrowing customer stored in the time information storage unit to a borrowing request period, the borrowing customer being a customer who wishes to borrow the resource, the borrowing request period indicating a period during which the borrowing customer is to provide the service utilizing a borrowed resource, the total borrowing period indicating a period during which the borrowing customer is to borrow the remaining resource; and determining whether the total borrowing period calculated in the secondly calculating is covered by the lendable period calculated in the firstly calculating, to determine to lend the remaining resource to the borrowing customer.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIGS. 3A and 3B are diagrams illustrating a total borrowing time zone and a lendable time zone;

FIG. 5 is a block diagram illustrating the configuration of the resource lending control apparatus according to the first embodiment;

FIG. 6 is a diagram illustrating a resource managing unit;

FIG. 7 is a diagram illustrating a pool information managing unit;

FIG. 12 is a diagram illustrating an allocation request from each customer used in the second embodiment;

DESCRIPTION OF EMBODIMENT(S)

Preferred embodiments of the present invention will be explained with reference to accompanying drawings. In the description below, main terminologies used in the embodiments, an outline and a feature of the resource lending control apparatus according to the embodiments, and the configuration of the resource lending control apparatus and a process flow will be sequentially described and various modifications of the embodiments will be finally described.

[a] First Embodiment

Description of Terminologies

Figure 1:
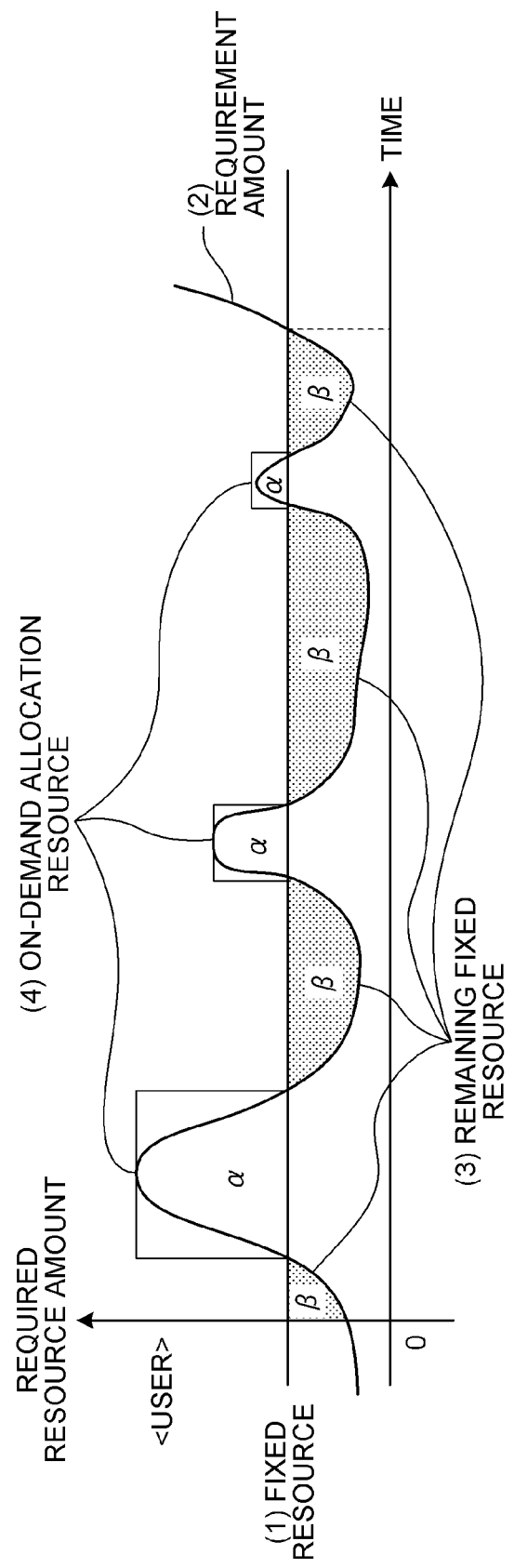
FIG. 1 is a diagram for explaining terminologies.

Firstly, main terminologies that are used in the first embodiment will be described. FIG. 1 is a diagram for explaining the terminologies. The "resource lending control apparatus" in the first embodiment controls lending of resources to each customer. Specifically, the resource lending control apparatus lends the resources (for example, server) to each customer. When an application of the customer is assigned to the resource, each customer provides a service thereof to an end user.

The "resource lending control apparatus" first provides a "fixed resource" to each customer. The "fixed resource" means a resource that is fixedly allocated to each customer on a steady basis (the fixed resource corresponds to (1) of FIG. 1). For example, in a common method, the amount of resources that are allocated as the "fixed resources" is determined by a contract between each customer and an IDC.

Even when the requirement amount (the resource amount actually used by the end user; the requirement amount corresponds to (2) of FIG. 1) of a customer system is less than the amount of the "fixed resources", the amount of resources that are allocated as the "fixed resources" remains allocated to the corresponding customer constantly. In this case, some of the "fixed resources" are not used for providing services and left unused. In other words, "remaining fixed resources" exist (which corresponds to (3) of FIG. 1).

Consequently, the "resource lending control apparatus" according to the first embodiment controls lending of the "remaining fixed resources" to the customer who has shortage of "fixed resources", as control of lending of the resources to the customer. That is, the "resource lending control apparatus" determines to lend the "remaining fixed resources" of the customer ("lending customer") having the "remaining fixed resources" to the customer ("borrowing customer") having the shortage of "fixed resources".

Outline and Feature of the Resource Lending Control Apparatus

Figure 2:
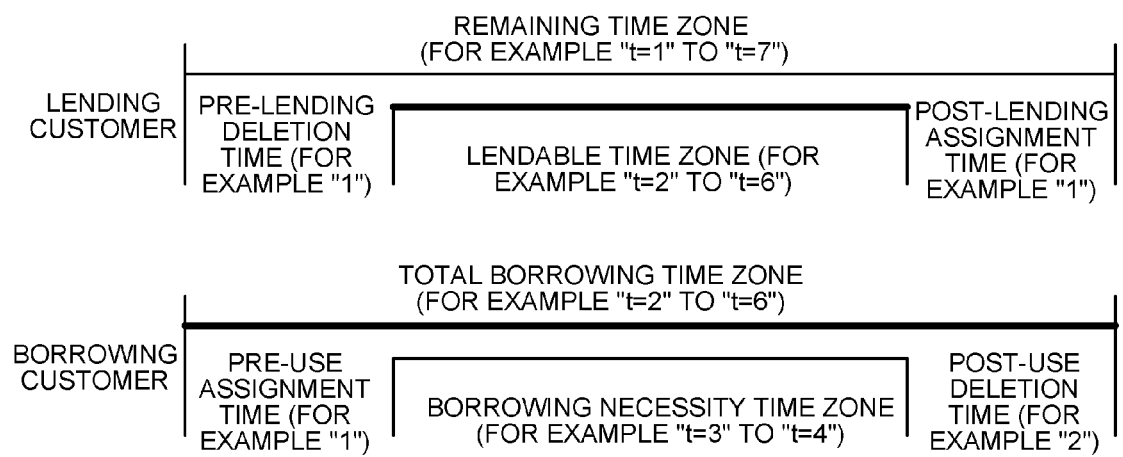
FIG. 2 is a diagram illustrating an outline and a feature of a resource lending control apparatus according to a first embodiment.

Next, an outline and a feature of the resource lending control apparatus according to the first embodiment will be described using FIG. 2. FIG. 2 illustrates an outline and a feature of the resource lending control apparatus according to the first embodiment.

As described above, the resource lending control apparatus according to the first embodiment determines to lend the remaining fixed resources of the lending customer to the borrowing customer. The main feature of the resource lending control apparatus that has the above outline is to appropriately allocate the resources, as described below.

The resource lending control apparatus according to the first embodiment stores an assignment time and a deletion time in association with each other. The assignment time indicates a time for assigning an application used by each customer to provide a service to a server. The deletion time indicates a time for deleting the application from the server.

For example, the resource lending control apparatus according to the first embodiment stores a deletion time "1 hour" and an assignment time "1 hour" for a customer A and stores a deletion time "1 hour" and an assignment time "2 hours" for a customer B.

The resource lending control apparatus according to the first embodiment subtracts the previously stored deletion time and assignment time of the lending customer from the remaining time zone and calculates a lendable time zone, with respect to the lending customer having the remaining fixed resources.

For example, assume that the customer A has the remaining time zone starting at the remaining start time "t=1" and ending at the remaining end time "t=7". In this case, as illustrated in the lending customer of FIG. 2, the resource lending control apparatus according to the first embodiment subtracts the pre-lending deletion time (for example, deletion time "1" for the customer A) and the post-lending assignment time (for example, assignment time "1" for the customer A) from the remaining time zone and calculates a lendable time zone "t=2 to t=6".

The resource lending control apparatus according to the first embodiment adds the previously stored assignment time and deletion time of the borrowing customer having the shortage of fixed resources to the time zone for which the borrowing customer requests the borrowing of resources (borrowing necessity time zone) and calculates the total time zone during which the resource is to be borrowed (total borrowing time zone), for the borrowing customer.

For example, assume that the customer B has the borrowing necessity time zone starting at the borrowing necessity start time "t=3" and ending at the borrowing necessity end time "t=4". In this case, as illustrated in the borrowing customer of FIG. 2, the resource lending control apparatus according to the first embodiment adds the pre-use assignment time (for example, assignment time "1" for the customer B) and the post-use deletion time (for example, deletion time "2" for the customer B) to the borrowing necessity time zone and calculates the total borrowing time zone "t=2 to t=6".

The resource lending control apparatus according to the first embodiment determines whether the calculated total borrowing time zone is covered by the lendable time zone to determine to lend the remaining fixed resources. For example, if the resource lending control apparatus is to determine whether the total borrowing time zone "t=2 to t=6" is covered by the lendable time zone "t=2 to t=6", the resource lending control apparatus would determine that the calculated total borrowing time zone is covered by the lendable time zone and determine to lend the remaining fixed resources with respect to the customer B.

In this way, the resource lending control apparatus according to the first embodiment can appropriately allocate the resources, as earlier mentioned as the main feature.

That is, the resource lending control apparatus according to the first embodiment takes into account not only the "remaining time zone" and the "borrowing necessity time zone" indicated by thin lines in FIG. 2 but also the deletion time and the assignment time for each customer, and calculates the "lendable time zone" and the "total borrowing time zone" indicated by thick lines in FIG. 2.

The resource lending control apparatus according to the first embodiment considers the assignment time and the deletion time to determine to lend the resources. Therefore, as compared with the conventional method where only the remaining time zone and the borrowing necessity time zone are considered, the resource lending control apparatus can determine to lend the resources in such a manner that the borrowing customer can assign an application thereof and provide a service of the borrowing customer, during the "borrowing necessity time zone" corresponding to the time where the borrowing customer needs to borrow the resources other than the fixed resources and provides the service.

Configuration of the Resource Lending Control Apparatus

Figure 4:
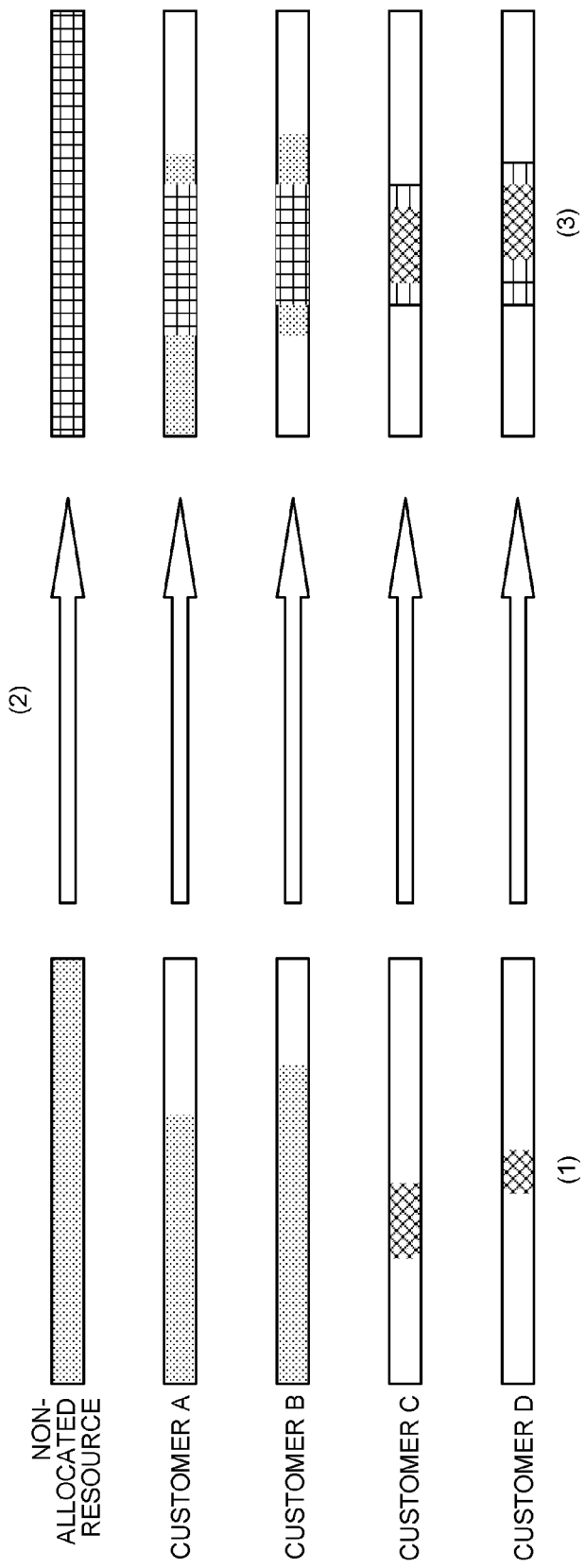
FIG. 4 is a diagram illustrating a deletion time and an assignment time used in the first embodiment.

Next, the configuration of a resource lending control apparatus 100 will be described using FIGS. 3A to 7. FIGS. 3A and 3B illustrate the total borrowing time zone and the lendable time zone. FIG. 4 illustrates the deletion time and the assignment time used in the first embodiment. FIG. 5 is a block diagram illustrating the configuration of the resource lending control apparatus according to the first embodiment. FIG. 6 illustrates a resource managing unit. FIG. 7 illustrates a pool information managing unit.

As illustrated in FIG. 5, the resource lending control apparatus 100 includes a server pool 200, an IDC managing unit 300, and a customer system 400. The resource lending control apparatus 100 receives a request for a service of each customer from the end user, through a network.

The configuration of the resource lending control apparatus 100 illustrated in FIG. 5 is a logical (conceptual) configuration, and is not a physical configuration. In other words, the present invention is not limited to the case where the server pool, the IDC managing unit, and the customer system are divided, as illustrated in FIG. 5. For example, the resource lending control apparatus 100 may include resources and an IDC managing unit to manage the resources, and the IDC managing unit may associate the resources and the customers with each other and store an association result, and the customer system may be assigned to the resources to be used. In addition, if the IDC managing unit receives an access with respect to a specific customer from the end user, the IDC managing unit may transmit the access to the resource used by the specific customer and transmit a response from the corresponding resource with respect to the access (in other words, provide a service to the end user who performs the access).

Contents Related to the Total Borrowing Time Zone and the Lendable Time Zone

The contents that are related to the total borrowing time zone and the lendable time zone calculated and used in the resource lending control apparatus 100 will be described briefly below using FIGS. 3A and 3B.

When the remaining fixed resource is lent to the server pool 200, as illustrated in FIGS. 3A and 3B, the application of the customer to whom the resource is allocated needs to be deleted, and when the lent resource is returned, the customer needs to assign the application again.

That is, in the first embodiment, as illustrated in FIGS. 3A and 3B, with respect to the "remaining fixed resource", the "remaining start time" that indicates the start time of the time zone during which the resource is the remaining fixed resource, "the remaining end time" that indicates the end time of the time zone during which the resource is the remaining fixed resource, and the "remaining time zone" that indicates the time zone during which the remaining fixed resource exists are considered. The "remaining time zone" is calculated by an equation of the "remaining time zone"="remaining end time"–the "remaining start time".

Since the non-allocated resources are resources that can be used by the other customers, the "remaining start time" is "0" (because the start is already made), the "remaining end time" is "∞" (because the time zone does not end), and the "remaining time zone" is "∞" (because the time zone does not end) (refer to FIG. 7 to be described below).

In the first embodiment, as illustrated in FIGS. 3A and 3B, with respect to the "remaining fixed resources", the "pre-lending deletion time" that indicates the time for deleting the application of the lending customer who lends the remaining fixed resources, the "post-lending assignment time" that indicates the time for assigning the application of the lending customer to the resources again, and the "lendable time zone" that indicates the "time zone" during which the remaining fixed resources can be allocated to the other customer in the time zone during which the remaining fixed resources exist are considered. The "lendable time zone" may also be referred to as a "lendable period", and indicates a period during which the remaining fixed resource can be lent. Further, the "pre-lending deletion time" may also be referred to as a "deletion time", and indicates a time for deleting the application of the customer from the server.

As illustrated in FIGS. 3A and 3B, the "lendable time zone" is a time zone that is obtained by subtracting the time for deleting the lending-side service and the time for assigning the application of the lending customer again before the resources are returned, from the "remaining time zone". The lendable time zone is calculated by an equation of the "lendable time zone=the "remaining time zone"–("the pre-lending deletion time"+the "post-lending assignment time").

As illustrated in FIGS. 3A and 3B, the "lendable time" that indicates the time when the other customer can actually use the remaining fixed resources lent to the other customer is calculated by an equation of the "lending start time"=the "remaining start time"+the "pre-lending deletion time".

As illustrated in FIGS. 3A and 3B, at the "lending end time" that indicates the time when the other customer needs to end the use of the remaining fixed resource, since the customer who lends the resource to the resource lending control apparatus 100 (server pool 200 thereof) needs to provide the service thereof at the "remaining end time", the time for the customer who lends the resources to assign the application again needs to be considered. Therefore, the "lending end time" is calculated by an equation of the "lending end time"=the "remaining end time"–the "post-lending assignment time".

With respect to the non-allocated resource, the pre-lending deletion time is "0" because the application is not originally assigned to the resource and does not need to be deleted, and the "post-lending assignment time" is "0" because the application does not need to be assigned to the resource.

The "spare resources" that are used in the first embodiment are resources that are additionally allocated (aside from the fixed resources) to the borrowing customer who has the shortage of fixed resources, when the fixed resources are insufficient due to an increase in the requirement amount or a failure of the fixed resources. For example, in a common method, as the spare resources, resources of the server pool 200 (for example, remaining fixed resources or non-allocated resources) are used. The spare resources are allocated by the necessary amount, when necessary, and are returned to the server pool, when unnecessary.

When the borrowing customer who requires allocation of the resource aside from the fixed resources borrows and uses the spare resource, first, the borrowing customer assigns the application thereof. When the borrowed resource server is to be returned to the resource lending control apparatus 100 (server pool 200 thereof), the borrowing customer deletes the application thereof to turn the resource into an empty state. Therefore, when the borrowing customer borrows the spare resource, the borrowing customer considers the time during which the borrowing customer provides a service using the spare resource and the pre-use assignment time and the post-use deletion time.

In the first embodiment, as illustrated in FIGS. 3A and 3B, with respect to the "spare resource", the "borrowing necessity start time" that indicates the time when the borrowing customer borrows the spare resource and starts providing a service thereof using the spare resource, the "borrowing necessity end time" that indicates the time when the borrowing customer who borrows the spare resource ends providing the service thereof using the spare resource, and the "borrowing necessity time zone" that indicates the time zone during which the borrowing customer who borrows the spare resource provides the service thereof using the spare resource are considered. The "borrowing necessity time zone" is calculated by an equation of the "borrowing necessity time zone"=the "borrowing necessity end time"−"borrowing necessity start time".

As illustrated in FIGS. 3A and 3B, with respect to the "spare resource", the "pre-use assignment time" that indicates the time for the customer who borrows the spare resources to assign the service thereof to the corresponding resource, the "post-use deletion time" that indicates the time for the customer who borrows the spare resources to delete the service thereof from the corresponding resource, and the "total borrowing time zone" that indicates the time zone during which the customer borrows the spare resource to provide a service using the borrowed spare resource are considered. The "total borrowing time zone" is calculated by an equation of the "total borrowing time zone"=the "borrowing necessity time zone"+(the "pre-use assignment time"+"post-use deletion time"). The "total borrowing time zone" may also be referred to as a "total borrowing period", and indicate a period during which the borrowing customer is to borrow the remaining fixed resource. The "post-use deletion time" may also be referred to as "deletion time", and indicate a time for deleting the application of the customer from the server. The "pre-use assignment time" may also referred to as the "assignment time", and indicate a time for assigning the application of the customer to the server.

In the first embodiment, as illustrated in FIGS. 3A and 3B, with respect to the "spare resource", the "pre-use assignment time" before the service is provided using the spare resource, the "borrowing start time" that indicates the time when the spare resource starts to be borrowed, the "post-use deletion time" after the service is provided using the spare resource, and the "borrowing end time" that indicates the time when borrowing of the spare resource ends are sequentially considered. The "borrowing start time" is calculated by an equation of the "borrowing start time"=the "borrowing necessity start time"−the "pre-use assignment time", and the "borrowing end time" is calculated by an equation of the "borrowing end time"=the "borrowing necessity start time"+the "post-use deletion time".

With Respect to the Resource Lending Control Apparatus

Hereinafter, a method adopted by the resource lending control apparatus 100 according to the first embodiment to store the deletion time and the assignment time in advance for each customer will be described, but the present invention is not limited thereto. For example, the resource lending control apparatus 100 may acquire the deletion time (post-use deletion time) and the assignment time (pre-use assignment time) of the borrowing customer and the deletion time (pre-lending deletion time) and the assignment time (post-lending assignment time) of the lending customer having the remaining fixed resource, whenever the resource lending control apparatus determines to lend the resource (or whenever the resource lending control apparatus receives a request for the spare resource from the borrowing customer having the shortage of fixed resources) and uses the deletion times and the assignment times.

In the description below, the resource lending control apparatus 100 according to the first embodiment stores the deletion time and the assignment time for each customer. In the following description, it is assumed that the post-use deletion time and the pre-lending deletion time are the same and the pre-use assignment time and the post-lending assignment time are the same for the same customer, but the present invention is not limited thereto. The resource lending control apparatus 100 according to the first embodiment may store the post-use deletion time and the pre-lending deletion time as different values, respectively, and store the pre-use assignment time and the post-lending assignment time as different values, respectively.

In the following description, if not otherwise specified, it is assumed that the remaining fixed resources exist in the time zone from "t=1" to "t=5.5" for the customer A, the remaining fixed resources exist in the time zone from "t=1" to "t=6" for the customer B, the resource shortage occurs in the time zone from "t=2.5" to "t=4" for the customer C, and the resource shortage occurs in the time zone from "t=3.5" to "t=4.5" for the customer D as illustrated in (1) of FIG. 4. Further, it is assumed, if not otherwise specified, that the deletion time is set to "1" and the assignment time is set to "1" for the customer A, the deletion time is set to "1.5" and the assignment time is set to "1.5" for the customer B, the deletion time is set to "0.5" and the assignment time is set to "0.5" for the customer C, and the deletion time is set to "1" and the assignment time is set to "1" for the customer D as illustrated in (2) of FIG. 4.

The server pool 200 is resources composed of the spare resources; and more specifically, the server pool 200 is configured with remaining fixed resources and non-allocated resources. The non-allocated resources are resources which have not been allocated as the fixed resources among the resources of the resource lending control apparatus 100. The resources constituting the server pool 200 are temporarily allocated to the borrowing customer by the IDC managing unit 300 described later.

The customer system 400 that is a system possessed by each customer includes a service providing unit 420 and a customer system managing unit 410 as illustrated in FIG. 5. The service providing unit 420 provides a service of the customer itself. Specifically, the service providing unit 420 receives an access from the end user and provides the service of the customer, and manages the server (resource) where the application is assigned to provide a unique service of each customer.

The customer system managing unit 410 includes a performance measuring unit 411, a predicting unit 412, a resource managing unit 413, a necessary resource determining unit 414, an assignment executing unit 415, and a customer-side communication unit 416. The resource managing unit 413 may also referred to as a "time information storage unit" and a "lendable period calculating unit".

The performance measuring unit 411 measures the requirement amount demanded by an access from the end user to the service providing unit 420. For example, the performance measuring unit 411 measures the amount of accesses from the end user per unit time and measures the amount of resources consumed to process the access of this amount.

The predicting unit 412 performs demand prediction based on information obtained from the performance measuring unit 411. For example, the predicting unit 412 predicts the amount of resources needed in the future in a unit time on the basis of the access amount per unit time measured by the performance measuring unit 411 and the consumed resource amount.

A specific example is described. When the predicting unit 412 performs prediction at a point of time of "t=0", the predicting unit 412 predicts the amount of resources needed during the time zone from "t=1" to "t=7". Specifically, the predicting unit 412 of the customer A predicts that there will be the remaining fixed resources during the time zone from "t=1" to "t=5.5", the predicting unit 412 of the customer B predicts that there will be the remaining fixed resources during the time zone from "t=1" to "t=6", the predicting unit 412 of the customer C predicts that there will be a shortage of the remaining fixed resources during the time zone from "t=2.5" to "t=4", and the predicting unit 412 of the customer D predicts that there will be a shortage of the remaining fixed resources during the time zone from "t=3.5" to "t=4.5".

The resource managing unit 413 stores the assignment time and the deletion time in association with each other. The assignment time indicates the time for assigning the application used to provide a service by the customer to the server. The deletion time indicates the time for deleting the application from the server. When the customer is the lending customer having the remaining fixed resource, the resource managing unit 413 subtracts the deletion time and the assignment time of the lending customer from the remaining time zone indicating the period during which the fixed resource remain without being used in providing a service, and calculates the lendable time zone that indicates the period during which the remaining fixed resource can be lent.

Specifically, as illustrated in FIG. 6, the resource managing unit 413 previously stores the deletion time and the assignment time. When the remaining fixed resource exists, the resource managing unit 413 stores a "server" which is information for identifying the server from the other servers, a "possessor" which is information indicating the possessor, a "type" which is information indicating the type of the server, a "resource amount" indicating the resource amount of the server, a "state" which is information indicating whether the server is being operated (for example, information indicating whether the resource is used to provide a service of the customer or the resource is lent to the server pool 200), a "remaining time zone" ("remaining start time" and "remaining end time"), a "remaining time", an "assignment time", a "deletion time", a "lendable time zone" ("lending start time" and "lending end time"), and a "lendable time" in association with each other.

In an example illustrated in FIG. 6, when the predicting unit 412 predicts that there will be the remaining fixed resources in the time zone from "t=1" to "t=5.5", the resource managing unit 413 of the customer A calculates the "lendable time zone" based on the previously stored assignment time "1t" and deletion time "1t". Thereafter, the resource managing unit 413 stores the server "Sa1", the possessor "customer A", the type "A", the resource amount "1r", the state "being used", the remaining start time "t=1", the remaining end time "t=5.5", the remaining time "4.5t", the assignment time "1t", the deletion time "1t", the lending start time "t=2", the lending end time "t=4.5", and the lendable time "2.5t".

In the first embodiment, the resource managing unit 413 stores the deletion time and the assignment time in advance, and calculates the lendable time zone when the remaining fixed resource exists. However, the present invention is not limited thereto. For example, the resource managing unit 413 may manage only "the remaining time zone". In this case, "the deletion time" and "the assignment time" may be stored in advance by the IDC managing unit 300 described later. The lendable time zone may be calculated based on "the remaining time zone" notified by the customer system 400.

The necessary resource determining unit 414 determines whether to lend the remaining fixed resource or request the spare resource. Specifically, the necessary resource determining unit 414 compares the demand prediction given by the predicting unit 412 and the previously allocated fixed resource. When the fixed resource is not sufficient as resource, the necessary resource determining unit 414 determines whether the spare resource is required or not. In addition, when there is a remaining fixed resource, the necessary resource determining unit 414 determines whether the remaining fixed resource can be lent or the current state is to be maintained (when the necessary resource determining unit 414 determines to maintain the current state, it means that the necessary resource determining unit 414 determines that the remaining fixed resource cannot be lent and the spare resource is not required). If the necessary resource determining unit 414 determines that the remaining fixed resource can be lent, the necessary resource determining unit 414 lends the remaining fixed resource.

Specifically, the necessary resource determining unit 414 acquires a predicted demand amount. For example, when process timing comes, the necessary resource determining unit 414 acquires the resource amount needed in the future, predicted by the predicting unit 412. Then, the necessary resource determining unit 414 calculates the amount of fixed resource previously allocated by the resource managing unit 413.

The necessary resource determining unit 414 compares the predicted demand amount and the amount of fixed resource. When the amount of fixed resource is larger than the predicted demand amount, in other words, when there is remaining fixed resource, the necessary resource determining unit 414 determines whether or not to lend the resource. For example, the necessary resource determining unit 414 determines whether the existing remaining fixed resource has a sufficient resource amount that can be lent to the server pool 200 or not. For example, the necessary resource determining unit 414 further determines whether the amount of the remaining fixed resource reaches a minimum required resource amount for lending the resource to the server pool 200 (e.g., when three servers (resources) are allocated to the customer A and the customer A lends out the resources on server basis, the necessary resource determining unit 414 determines whether one or more servers are remaining fixed resources or not).

On determining that the resource can be lent, the necessary resource determining unit 414 notifies the IDC managing unit 300 that the remaining fixed resource is to be lent to the server pool 200. For example, when the necessary resource determining unit 414 determines to lend the remaining fixed resource to the server pool 200, the necessary resource determining unit 414 notifies the IDC managing unit 300 that the remaining fixed resource is to be lent to the server pool 200 (for example, the necessary resource determining unit 414 notifies "lendable time zone", "lendable time", and "lending end time" managed by the resource managing unit 413) through the customer-side communication unit 416. Then, the necessary resource determining unit 414 ends the process. On the other hand, on determining that the resource cannot be lent, the necessary resource determining unit 414 immediately ends the process.

Meanwhile, the necessary resource determining unit 414 compares the predicted demand amount and the amount of the fixed resource. When the amount of fixed resource is smaller than the predicted demand amount, the necessary resource determining unit 414 determines whether there are resources being lent to the server pool 200. When there is a lent resource, that is, when the customer lends out the remaining fixed resource to the server pool 200 and the remaining fixed resource is not allocated to and used by the other borrowing customer, the necessary resource determining unit 414 makes a return request of the lent remaining fixed resource.

The necessary resource determining unit 414 may determine whether to make a return request or not based on the amount of remaining fixed resource lent to the server pool 200 and the amount of resource shortage. Specifically, when more than one remaining fixed resource are lent to the server pool 200, the necessary resource determining unit 414 may request the return of only a remaining fixed resource of the same amount as the amount of shortage.

When only one remaining fixed resource is lent and the amount of the lent remaining fixed resource is smaller than the amount of shortage, the necessary resource determining unit 414 may not request the return of the remaining fixed resource. In other words, even when the remaining fixed resource is lent to the server pool 200 and the predicting unit 412 predicts that there will be a shortage of resource, the necessary resource determining unit 414 may not request the return of the remaining fixed resources thereof.

The necessary resource determining unit 414 determines whether the resource shortage will be resolved by the returned remaining fixed resources thereof. On determining that the resource shortage will be resolved, the necessary resource determining unit 414 ends the process.

On the other hand, on determining that the resource shortage will not be resolved by the returned remaining fixed resource thereof or that there is no resource lent to the server pool 200, the necessary resource determining unit 414 makes a request (allocation request) to borrow the resource. For example, the necessary resource determining unit 414 notifies the IDC managing unit 300 of the "borrowing necessity time zone". Then, the necessary resource determining unit 414 ends the process.

In the description of the first embodiment, the necessary resource determining unit 414 transmits the "borrowing necessity time zone", and an allocation determining unit 303 described later calculates the "total borrowing time zone" based on the transmitted "borrowing necessity time zone". However, the present invention is not limited thereto. Alternatively, for example, the necessary resource determining unit 414 may calculate the "total borrowing time zone" based on the "borrowing necessity time zone", and transmit the "total borrowing time zone".

When the remaining fixed resource can be lent, the assignment executing unit 415 executes a process for lending the remaining fixed resources to the server pool 200. When the spare resource is allocated, the assignment executing unit 415 executes a process for borrowing the spare resource. Specifically, the assignment executing unit 415 deletes the assigned application of the customer from the remaining fixed resource to be lent (for example, deletes the application when a current time becomes the remaining start time), and assigns the application of the customer to the returned remaining fixed resource. The assignment executing unit 415 assigns the application of the customer to the allocated spare resource, and deletes the assigned application of the customer, when the allocated spare resource is returned.

The customer-side communication unit 416 exchanges information with the IDC managing unit 300. Specifically, the customer-side communication unit 416 notifies the IDC managing unit 300 of information indicating that the remaining fixed resource can be lent (for example, "lendable time zone" or "lendable time" and "lending end time"), notifies the IDC managing unit 300 of information indicating that the spare resource is needed (specifically, "borrowing necessity time zone"), notifies the IDC managing unit 300 of information indicating that the return of the lent remaining fixed resource is requested, receives a response from the IDC managing unit 300 with respect to the information, and receives information indicating that the remaining fixed resource for which the lendable time zone passes is returned, from the IDC managing unit 300.

As illustrated in FIG. 5, the IDC managing unit 300 includes a customer information managing unit 301, a pool information managing unit 302, an allocation executing unit 304, a return resource receiving unit 305, a return request handling unit 306, the allocation determining unit 303, and an IDC-side communication unit 307. The customer information managing unit 301 may also be referred to as a "time information storage unit", and serves to store an assignment time and a deletion time of a customer in association with each other. The pool information managing unit 302 may also be referred to as a "time information storage unit" and a "lendable period calculating unit", and serves to store an assignment time and a deletion time of a customer in association with each other, as well as, serves to calculate a period during which the remaining fixed resource of a lending customer can be lent. The allocation determining unit 303 may also be referred to as a "total borrowing period calculating unit" and a "lending determining unit", and serves to calculate a period during which a borrowing customer is to borrow the remaining fixed resource, as well as serves to determine whether the period during which the borrowing customer is to borrow the remaining fixed resource is covered by the period during which the remaining fixed resource of the lending customer can be lent.

In the customer information managing unit 301, for each customer, the assignment time and the deletion time are associated with each other and stored. Specifically, for all of the customers, the assignment time and the deletion time are associated with each other and stored.

In the description of the first embodiment, the resource managing unit 413 described earlier manages the resources allocated to each customer. However, the present invention is not limited thereto. For example, the customer information managing unit 301 may manage the information that is managed by the resource managing unit 413. Specifically, the resource managing unit 413 may notify the customer information managing unit 301 of the information related to the allocated resource whenever the resource is allocated (or for every constant period), and the customer information managing unit 301 may manage the information related to the resources, with respect to all of the customers. Alternatively, the resource managing unit 413 and the customer information managing unit 301 may synchronize the managed information, and both the resource managing unit 413 and the customer information managing unit 301 may manage the information related to the resources that are allocated to each customer.

The pool information managing unit 302 manages information of resources that constitute the server pool 200. That is, the pool information managing unit 302 stores the information related to the resources that can be allocated to the borrowing customer. Specifically, the pool information managing unit 302 stores information that is related to the remaining fixed resources with respect to the lending customer and the non-allocated resources. The pool information managing unit 302 stores the assignment time and the deletion time in association with each customer. For example, as illustrated in FIG. 7, the pool information managing unit 302 stores a "server", a "possessor", a "type", a "resource amount", a "state", a "remaining start time", a "remaining end time", a "remaining time zone", an "assignment time", a "deletion time", a "lending start time", a "lending end time", and a "lendable time" and the resources that can be allocated to the borrowing customer in association with each other.

Specifically, in an example illustrated in FIG. 7, with respect to the non-allocated resource, the pool information managing unit 302 stores a server "Sx1", a possessor "IDC", a type "A", a resource amount "1r", a state "non-use", a remaining start time "0", a remaining end time "∞", a remaining time "∞", an assignment time "0", a deletion time "0", a lending start time "0", a lending end time "∞", and a lendable time "∞". The pool information managing unit 302 stores similar items for the remaining fixed resource of the customer B and the remaining fixed resource of the customer A.

The pool information managing unit 302 manages information that is related to the resources (remaining fixed resource and the non-allocated resource) constituting the server pool 200. Specifically, the pool information managing unit 302 manages the stored information. For example, the pool information managing unit 302 detects the resource for which the lending end time (or remaining end time) has passed, deletes the information, and notifies the customer system 400 of the deletion of the information. The pool information managing unit 302 provides information related to the resources that can be allocated to the borrowing customer to the allocation determining unit 303 described later. If the resource is allocated by the allocation executing unit 304 described later, the pool information managing unit 302 executes a process of updating the "state" associated with the allocated resource to "being allocated (being lent)" indicating that the resource is being allocated.

The allocation determining unit 303 adds the assignment time and the deletion time of the borrowing customer to the borrowing necessity time zone indicating the period where the borrowing customer having the shortage of fixed resource desires to provide a service using the borrowed resource, and calculates the total borrowing time zone indicating the period during which the remaining fixed resources need to be borrowed. For example, when the allocation determining unit 303 receives the borrowing necessity time zone "t=2.5 to t=4" from the necessary resource determining unit 414 of the customer C, the allocation determining unit 303 adds the deletion time "0.5t" and the assignment time "0.5t" that are associated with the customer C and calculates the total borrowing time zone "t=2 to t=4.5".

The allocation determining unit 303 determines whether the calculated total borrowing time zone is covered by the lendable time zone calculated by the necessary resource determining unit 414, and determines to lend the remaining fixed resources and the non-allocated resources or not. Specifically, in addition to the determination on whether the total borrowing time zone is covered by the lendable time zone, the allocation determining unit 303 further determines a remaining fixed resource for which a difference between the total borrowing time zone and the lendable time zone is minimal, among the remaining fixed resources determined to be covered by the lendable time zone, and determines to lend the remaining fixed resource.

In an example illustrated in FIG. 7, the allocation determining unit 303 determines whether the calculated total borrowing time zone "t=2 to t=4.5" of the customer C is covered by the lendable time zone "t=2 to t=4.5" of the customer A, and determines that the calculated total borrowing time zone is included in the lendable time zone. Further, the allocation determining unit 303 determines whether the calculated total borrowing time zone "t=2 to t=4.5" is covered by the lendable time zone "t=2.5 to t=4.5 of the customer B, and determines that the calculated total borrowing time zone is not covered by the lendable time zone. Further, the allocation determining unit 303 determines whether the calculated total borrowing time zone "t=2 to t=4.5" is covered by the lendable time zone "∞" of the non-allocated resource, and determines that the calculated total borrowing time zone is covered by the lendable time zone. Then, the allocation determining unit 303 determines that, of the non-allocated resource and the remaining fixed resource of the customer A that are determined to cover the total borrowing time zone of the customer C, the remaining fixed resource of the customer A is the resource for which the difference between the total borrowing time zone and the lendable time zone is minimal. Thus, the allocation determining unit 303 determines to lend the remaining fixed resource of the customer A during the time zone from "t=2 to t=4.5".

In the above example, the allocation determining unit 303 determines which of the remaining fixed resource of the customer A and the non-allocated resource is the resource for which the difference between the total borrowing time zone and the lendable time zone is minimal. However, when the lendable time zones of the remaining fixed resources of more than one customers can cover the total borrowing time zone, the allocation determining unit 303 determines which of the remaining fixed resources of more than one customers (and the non-allocated resource) is the resource for which the difference between the total borrowing time zone and the lendable time zone is minimal.

Here, "the resource for which the difference between the total borrowing time zone and the lendable time zone is minimal" means a resource whose lendable time zone is closest to the total borrowing time zone in terms of its length (and the time it exists).

To explain further with a specific example, if the allocation determining unit 303 receives an allocation request from the customer, the allocation determining unit 303 compares the received "borrowing necessity time zone" and the "lending start time" stored by the pool information managing unit 302. That is, if the allocation determining unit 303 receives the borrowing necessity time zone "t=2.5 to t=4" from the customer C, the allocation determining unit 303 calculates the borrowing start time "t=2" which is the start time obtained by subtracting the assignment time "0.5t" previously stored in the customer information managing unit 301 from the borrowing necessity start time "t=2.5", and compares the calculated "borrowing start time" "t=2" and the "lending start time" stored by the pool information managing unit 302.

Then, the allocation determining unit 303 detects candidates. For example, the allocation determining unit 303 detects the resources for which the "lending start time" is set before the "borrowing start time". Specifically, if the borrowing start time is "t=2", the allocation determining unit 303 detects only the resources whose lending start time is the time before "t=2" as the candidates. When the allocation determining unit 303 does not detect the candidates, the allocation determining unit 303 ends the process.

Meanwhile, when the allocation determining unit 303 detects the candidates, the allocation determining unit 303 compares the "borrowing end time" and the "lending end time" for each of the detected candidates. More specifically, if the allocation determining unit 303 receives the lending necessity time zone "t=2.5 to t=4" from the customer C, the allocation determining unit 303 calculates the borrowing end time "t=4.5" corresponding to the end time that is obtained by adding the deletion time "0.5t" previously stored in the customer information managing unit 301 to the borrowing necessity end time "t=4", and compares the "lending end time" associated with each of the candidates and the calculated "borrowing end time" "t=4.5".

Then, the allocation determining unit 303 detects the candidates. For example, the allocation determining unit 303 detects the resources whose "lending end time" is set after the "borrowing end time". Specifically, if the borrowing end time is "t=4.5", the allocation determining unit 303 detects only the resources whose lending end time is the time after t=0.5 as the candidates. When the allocation determining unit 303 does not detect the candidates, the allocation determining unit 303 ends the process.

Meanwhile, when the allocation determining unit 303 detects the candidates, the allocation determining unit 303 detects a resource for which the difference between the "total borrowing time zone" and the "lendable time zone" is minimal, from the candidates. For example, when the borrowing necessity time zone is "t=2 to t=4.5" (that is, 2.5t) and the "lendable times" of the resources detected as the candidates are "2.5t", "5t", and "∞", the allocation determining unit 303 detects the resource for which the difference is minimal, i.e., the resource whose lendable time is "2.5t". The allocation determining unit 303 determines to lend the detected resource. Then, the allocation determining unit 303 ends the process.

The allocation executing unit 304 executes the lending of the resource determined by the allocation determining unit 303. For example, when the allocation determining unit 303 determines to lend the remaining fixed resource of the customer A during the time zone from "t=2 to t=4.5", the allocation executing unit 304 instructs to delete the application of the customer A from the remaining fixed resource of the customer A at the time "t=1", instructs to assign the application of the customer C to the remaining fixed resource at the time "t=2", instructs to delete the application of the customer C from the remaining fixed resource at the time "t=4", and instructs to assign the application of the customer A again at the time "t=4.5".

The return resource receiving unit 305 executes a process of receiving the server returned from the borrowing customer. For example, if the non-allocated resource is returned, the return resource receiving unit 305 notifies the pool information managing unit 302 of information indicating that the non-allocated resource is returned, and causes the pool information managing unit 302 to change the "state" stored with respect to the non-allocated resource from "being lent" to "non-use".

The return request handling unit 306 executes a process of returning the server lent to the server pool 200, according to the return request from the lending customer. For example, when the remaining fixed resource is lent from the lending customer but not lent to other borrowing customers, the return request handling unit 306 returns the remaining fixed resource.

The IDC-side communication unit 307 exchanges data with the customer system 400. Specifically, the IDC-side communication unit 307 exchanges data with the customer-side communication unit 416, receives information (for example, "lendable time" and "lending end time") indicating that the remaining fixed resource is lent and transmits the information to the pool information managing unit 302, and receives information (specifically, "borrowing necessity time zone") indicating that the spare resource is needed and notifies the allocation determining unit 303 of the information. The IDC-side communication unit 307 receives information indicating that the return of the lent remaining fixed resource is requested when the load exceeding the predicted load is generated, and transmits the information to the return request handling unit 306. The IDC-side communication unit 307 notifies the customer-side communication unit 416 of a response with respect to the information.

The method in which the resource lending control apparatus 100 according to the first embodiment previously stores the deletion time and the assignment time for each customer is described, but the present invention is not limited thereto. For example, the resource lending control apparatus 100 may acquire the deletion time (post-use deletion time) and the assignment time (pre-use assignment time) of the borrowing customer and the deletion time (pre-lending deletion time) and the assignment time (post-lending assignment time) of the lending customer having the remaining fixed resource, and use the deletion times and the assignment times whenever the resource lending control apparatus 100 determines to lend the resource (or receives a request to lend the spare resource from the borrowing customer having a shortage of fixed resource).

In the description of the first embodiment, the resource lending control apparatus 100 stores the deletion time and the assignment time for each customer, and the post-use detection time and the pre-lending detection time are the same and the pre-use assignment time and the post-lending assignment time are the same. However, the present invention is not limited thereto. For example, the resource lending control apparatus 100 according to the first embodiment may store the post-use deletion time and the pre-lending deletion time as different values, respectively, and store the pre-use assignment time and the post-lending assignment time as different values, respectively.

For convenience of explanation, the case where the resource lending control apparatus 100 includes the IDC managing unit 300, the server pool 200, and the customer system 400 is described, but the present invention is not limited thereto. For example, the resource lending control apparatus 100 may include only the IDC managing unit 300, and the server pool 200 and the customer system 400 may exist as an external device of the resource lending control apparatus.

For example, the customer information managing unit 301 of the IDC managing unit 300 may also be referred to as a "time information storage unit", and stores the "deletion time" and the "assignment time" in advance. The allocation determining unit 303 of the IDC managing unit 300 may further be referred to as a "lendable period calculating unit" and calculate the lendable time (i.e., lendable period).

Specifically, the customer information managing unit 301 previously stores the "deletion time" and the "assignment time", and the resource managing unit 413 notifies the customer information managing unit 301 of the information (for example, "remaining time zone") related to the allocated resources, whenever the resources are allocated (or for every constant period), and the customer information managing unit 301 manages the information related to the resources, with respect to all of the customers. The allocation determining unit 303 may determine whether to lend the resources or not based on the lendable time zone and the total borrowing time zone. Likewise, the resource managing unit 413 and the customer information managing unit 301 may synchronize the managed information, both the resource managing unit 413 and the customer information managing unit 301 may manage the information related to the resources that are allocated to each customer, and the allocation determining unit 303 may determine whether to lend the resources or not based on the lendable time zone and the total borrowing time zone.

Figure 8:
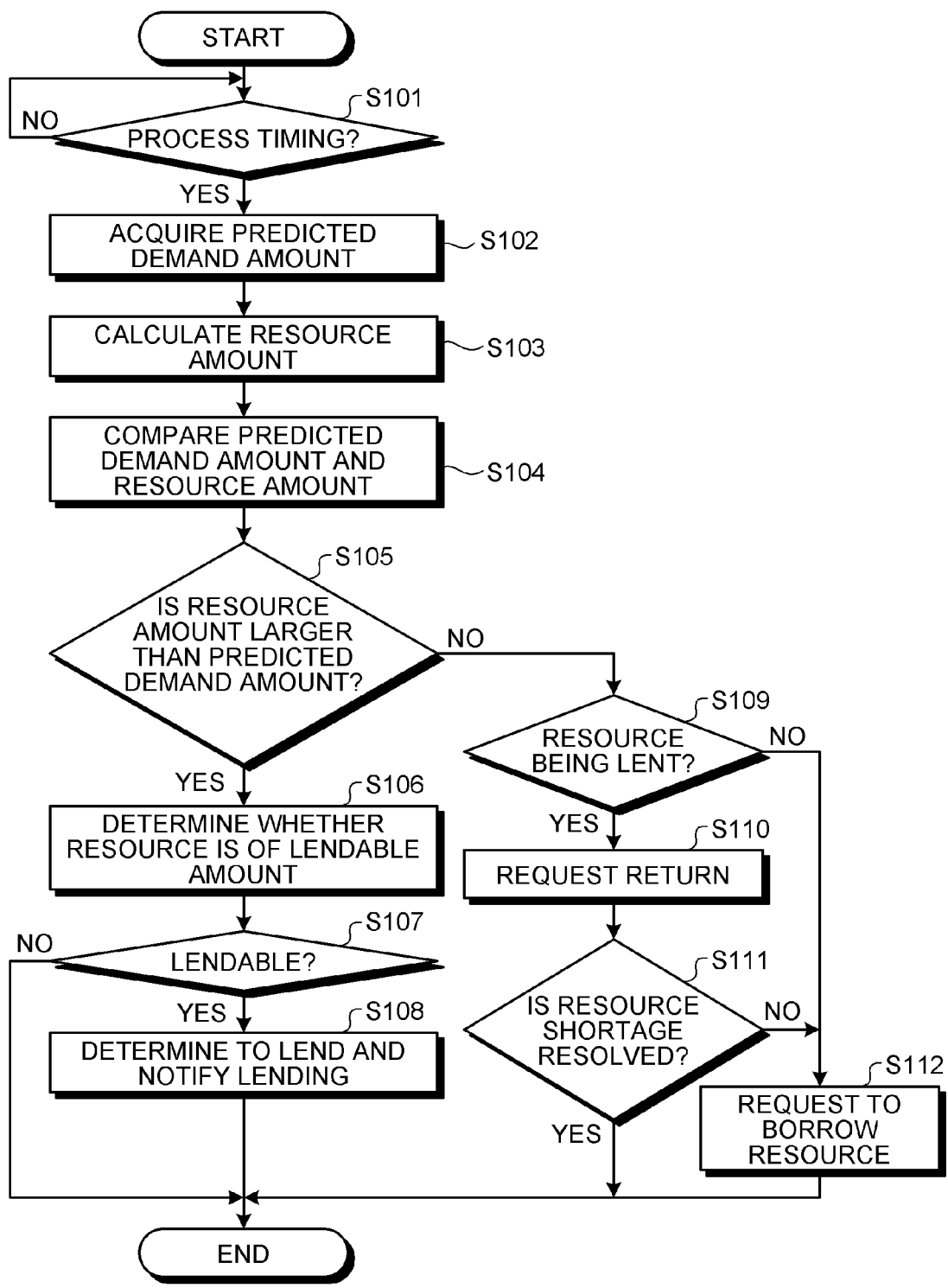
FIG. 8 is a flowchart illustrating a process based on a necessary resource judgment in the first embodiment.

Process Based on the Necessary Resource Determining Unit in the First Embodiment Next, a process that is executed by the resource lending control apparatus according to the first embodiment will be described using FIG. 8. FIG. 8 is a flowchart illustrating a process based on a necessary resource judgment in the first embodiment.

As illustrated in FIG. 8, when process timing comes (step S101: YES), the necessary resource determining unit 414 acquires the predicted demand amount (step S102). For example, when the process timing comes, the necessary resource determining unit 414 acquires the resource amount needed in the future, which is predicted by the predicting unit 412. The necessary resource determining unit 414 calculates the amount of the fixed resource previously allocated by the resource managing unit 413 (step S103).

The necessary resource determining unit 414 compares the predicted demand amount and the amount of fixed resource (step S104). In this case, when the amount of fixed resource is larger than the predicted demand amount (step S105: YES), that is, when there is a remaining fixed resource, the necessary resource determining unit 414 determines whether or not to lend the resource (step S106). For example, the necessary resource determining unit 414 determines whether or not the amount of the remaining fixed resource reaches the amount of resource lendable to the server pool 200. In other words, the necessary resource determining unit 414 determines whether the amount of the remaining fixed resource reaches the minimum required amount of resource for lending the resource to the server pool 200 (e.g., when three servers (resources) are allocated to the customer A and the customer A lends out the resources on server basis, the necessary resource determining unit 414 determines whether one or more servers are remaining fixed resources or not).

When the necessary resource determining unit 414 determines that the resource can be lent (step S107: YES), the necessary resource determining unit 414 notifies the IDC managing unit 300 that the remaining fixed resource is lent to the server pool 200 (step S108). For example, the necessary resource determining unit 414 determines to lend the remaining fixed resource to the server pool 200 and notifies the IDC managing unit 300 that the remaining fixed resource is lent to the server pool 200 (for example, "lendable time zone" or "lendable time" and "lending end time") through the customer-side communication unit 416. Then, the necessary resource determining unit 414 ends the process. On the other hand, when the necessary resource determining unit 414 determines that the resource is not lent (step S107: NO), the necessary resource determining unit 414 ends immediately the process.

Meanwhile, when it is determined in step S105 that the amount of fixed resource is smaller than the predicted demand amount (step S105: NO), the necessary resource determining unit 414 determines whether there is a resource lent to the server pool 200 (step S109). When the lent resources exist (step S109: YES), in other words, when the remaining fixed resource of the customer is lent to the server pool 200 and not allocated to and not used by other borrowing customers, the necessary resource determining unit 414 requests to return the remaining fixed resource (step S110).

The necessary resource determining unit 414 determines whether the resource shortage is resolved by the returned remaining fixed resource thereof (step S111). When the resource shortage is resolved (step S111: YES), the necessary resource determining unit 414 ends the process.

Meanwhile, when the necessary resource determining unit 414 determines that the resource shortage is not resolved by the returned remaining fixed resource thereof (step S111: NO) or determines that there is no resource lent to the server pool 200 in step S109 (step S109: NO), the necessary resource determining unit 414 makes request to borrow the resource (allocation request) (step S112). For example, the necessary resource determining unit 414 notifies the IDC managing unit 300 of the "borrowing necessity time zone". Next, the necessary resource determining unit 414 ends the process.

Process Based on the Allocation Determining Unit in the First Embodiment

Figure 9:
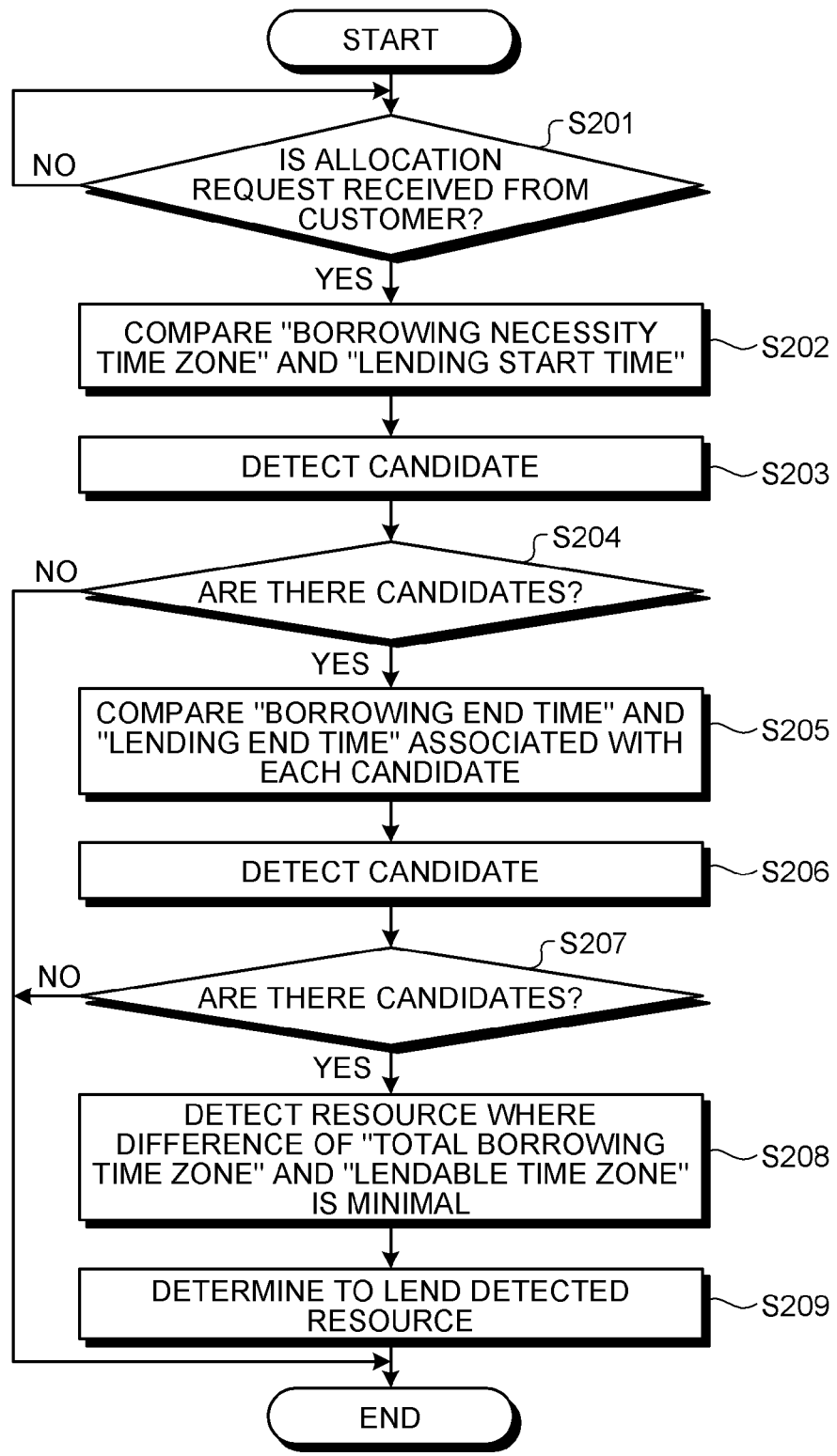
FIG. 9 is a flowchart illustrating a process performed by an allocation determining unit in the first embodiment.

Next, the process based on the allocation determining unit in the first embodiment will be described using FIG. 9. FIG. 9 is a flowchart illustrating the process based on the allocation determining unit in the first embodiment.

As illustrated in FIG. 9, if the allocation determining unit 303 receives an allocation request from the customer (step S201: YES), the allocation determining unit 303 compares the received "borrowing necessity time zone" and the "lending start time" stored by the pool information managing unit 302 (step S202). That is, if the allocation determining unit 303 receives the borrowing necessity time zone "t=2.5 to t=4" from the customer C, the allocation determining unit 303 calculates the borrowing start time "t=2" corresponding to the start time that is obtained by subtracting the assignment time "0.5t" previously stored in the customer information managing unit 301 from the borrowing necessity start time "t=2.5", and compares the calculated borrowing start time "t=2" and the "lending start time" stored by the pool information managing unit 302.

The allocation determining unit 303 detects candidates (step S203). For example, the allocation determining unit 303 detects the resource whose "borrowing start time" is set before the "lending start time". Specifically, if the borrowing start time is "t=2", the allocation determining unit 303 detects only the resources whose lending start time is before t=2 as the candidates. When the allocation determining unit 303 does not detect the candidates (step S204: NO), the allocation determining unit 303 ends the process.

On the other hand, when the allocation determining unit 303 detects the candidates (step S204: YES), the allocation determining unit 303 compares the "borrowing end time" and the "lending end time" for each of the detected candidates (step S205). Specifically, if the allocation determining unit 303 receives the borrowing necessity time zone "t=2.5 to t=4" from the customer C, the allocation determining unit 303 calculates the borrowing start time "t=4.5" corresponding to the start time that is obtained by adding the deletion time "0.5t" previously stored in the customer information managing unit 301 to the borrowing necessity end time "t=4", and compares the "lending end time" associated with each of the candidates and the calculated borrowing start time "t=4.5".

The allocation determining unit 303 detects the candidates (step S206). For example, the allocation determining unit 303 detects the resources whose "lending end time" is set after the "borrowing end time". Specifically, if the borrowing end time is "t=4", the allocation determining unit 303 detects only the resources whose lending end time is after "t=4" as the candidates. When the allocation determining unit 303 does not detect the candidates (step S207: NO), the allocation determining unit 303 ends the process.

On the other hand, when the allocation determining unit 303 detects the candidates (step S207: YES), the allocation determining unit 303 detects the resource for which the difference between the "total borrowing time zone" and the "lendable time zone" is minimal, from the candidates (step S208). For example, when the borrowing necessity time zone is "t=2 to t=4.5" (that is, 2.5t) and the "lendable time zones" of the resources detected as the candidates are "2.5t", "5t", and "∞", the allocation determining unit 303 detects the resource for which the difference is minimal, i.e., the resource whose lendable time is "2.5t". The allocation determining unit 303 determines to lend the detected resource (step S209). Then, the allocation determining unit 303 ends the process.

Effect According to the First Embodiment

As described above, according to the first embodiment, the resource lending control apparatus stores the assignment time and the deletion time in association with each other, for each customer, calculates the lendable period and the total borrowing period, determines whether the total borrowing period is covered by the lendable period, and determines whether to lend the remaining fixed resource or not. Therefore, the resource lending control apparatus according to the first embodiment can appropriately allocate the resources.

In the conventional method, the resource lending control apparatus charges a sum of a usage fee of the fixed resources and a usage fee of the spare resources (on-demand resources) as a usage fee of the resources charged for each customer. The fixed resource is allocated constantly and the usage fee of the fixed resource is a fixed sum. Meanwhile, since the use amount of the spare resource changes, the usage fee of the spare resource changes whenever the use amount changes. In general, the price per unit resource per unit time is higher for the spare resources than for the fixed resources. Accordingly, to effectively reduce the usage fee of the resources, it is important for the customer to accurately grasp the amount of needed resources (requirement amount) and appropriately divide the amount constantly handled by the fixed resource and the amount handled by the spare resource.

Further, the customer reduces unproductive cost (in other words, usage fee which is paid even though the customer is not using the amount corresponding to the remaining fixed resource) by offering a remaining fixed resource to other customers, in other words, the customer offers un-used resource among the fixed resource allocated to each customer on constant basis to other customer. On the other hand, the resource lending control apparatus provides the services using as small amount of resources as possible, because the cost can be reduced as the amount of provided resources in operation decreases.

Unlike the conventional method as described above, resource lending control apparatus of the first embodiment determines whether to lend the resources or not considering the assignment time and the deletion time, on allocating the remaining fixed resource to the resource-shortage customer, and therefore, it is possible to appropriately allocate the remaining fixed resource which can be used during the period in which the resource-shortage customer needs the remaining fixed resource (i.e., the period in which the resource-shortage customer needs to provide its service by borrowing the remaining fixed resource).

Figure 10:
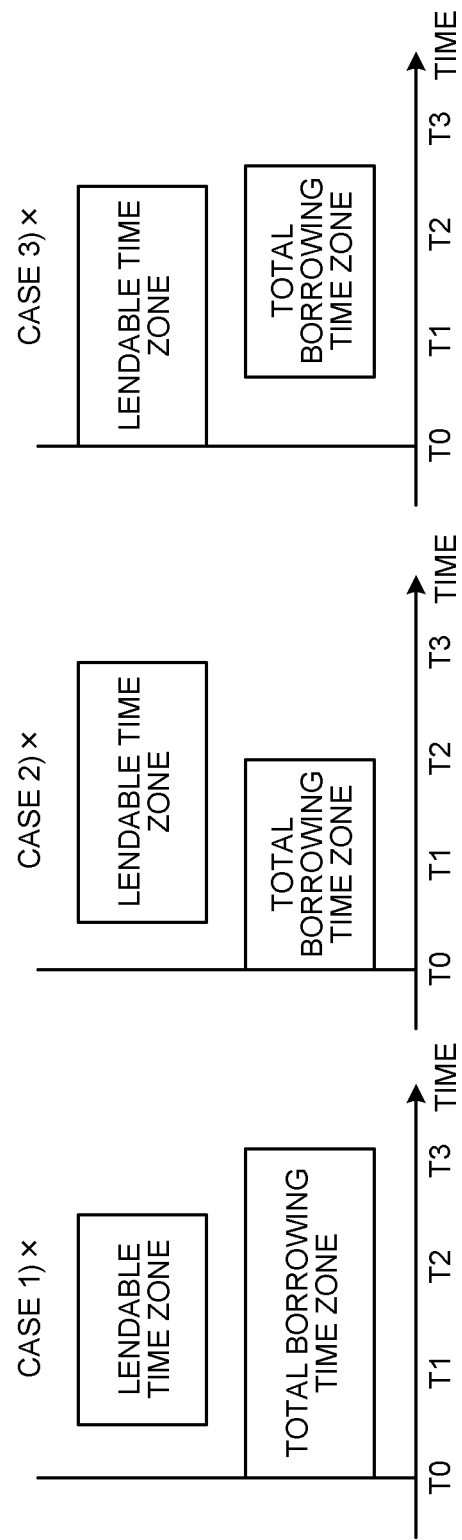
FIG. 10 is a diagram illustrating an effect according to the first embodiment.

Specifically, the resource lending control apparatus determines whether the total borrowing period is covered by the lendable period and determines whether to lend the remaining fixed resource or not. Therefore, as illustrated in "CASE 1" to "CASE 3" of FIG. 10, it is possible to prevent the resource lending control apparatus from determining to allocate the remaining fixed resource whose lendable period is shorter than the total borrowing period, and thus, the remaining fixed resources can be allocated appropriately. FIG. 10 illustrates the effect according to the first embodiment.

In addition, when the first embodiment is adopted, the resource lending control apparatus can determine to supply resources (servers) of a necessary amount, when necessary, for example. As a result, choices in IT investment can be increased, an operation cost can be reduced, and business can be performed at a high speed.

In addition, for example, when the first embodiment is adopted, each customer can suppress an unnecessary investment incurred from the remaining fixed resources, the resource lending control apparatus can efficiently allocate the remaining fixed resource of each customer as the spare resource to other customers, use efficiency of the resources can be improved, the amount of resources that are prepared as the server pool 200 (in particular, non-allocated resources) can be reduced, and the amount of resources that are prepared for the entire resource lending control apparatus can be reduced.

[b] Second Embodiment

In the first embodiment, the description is not given on whether the remaining fixed resources are handled in a state where the application (of the customer) previously allocated to the fixed resources is deleted or is handled in a state where the application is assigned. In the second embodiment, the remaining fixed resources in a state where the application (of the customer) previously assigned thereto is deleted is distinguished from the remaining fixed resources in a state where the application is assigned, and two different types of remaining fixed resources are handled differently when the remaining fixed resources are lent to the server pool 200.

Specifically, two different types of the fixed resources may be distinguished. One is a hot-standby remaining fixed resource (hereinafter, "HS resource"), and another is a meta remaining fixed resource (hereinafter "meta resource"). The HS resource is a remaining fixed resource in a state where an application is assigned by a customer, to which this resource is allocated as the fixed resource in advance. The meta resource is a remaining fixed resource in a state where the application used by the customer, to which this resource is allocated as the fixed resource in advance, is deleted.

For example, the HS resource is handled in a state where the previously allocated application of the customer is assigned. When the HS resource is lent from the customer to the server pool 200, the HS resource is lent in a state where the application of the lending customer is assigned. When the HS resource that exists in the server pool 200 is returned to the lending customer, the application of the lending customer does not need to be assigned again in the lending customer. The post-lending assignment time of the HS resource is "0". Meanwhile, when the other borrowing customer borrows the HS resource, the previously assigned application (of the lending customer) needs to be deleted (and the application of the borrowing customer needs to be assigned).

The meta resource is handled in a state where the previously allocated application of the customer is deleted. When the meta resource is lent from the customer to the server pool 200, the meta resource is lent in a state where the application of the lending customer is deleted. When the meta resource that exists in the server pool 200 is returned to the lending customer, the lending customer needs to assign the application thereof again. Meanwhile, when the other borrowing customer borrows the meta resource, it is sufficient that the application of the borrowing customer is assigned (in other words, the deletion of the application of the lending customer is not required).

For this reason, the time needed when the meta resource is allocated to the borrowing customer is about several minutes from a point of time when allocation is determined (in other words, the time needed is only the time required for assigning the application of the customer to whom the meta resource is allocated). Meanwhile, the time needed when the HS resource is allocated is about several tens of minutes from a point of time when allocation is determined (in other words, the time needed is sum of the time required for deleting the application of the lending customer and the time required for assigning the application of the customer to whom the HS resource is allocated). When the HS resource is returned to the lending customer of the HS resource, the lending customer can provide a service using the HS resource immediately after the return. On the other hand, when the meta resource is returned to the lending customer of the meta resource, a certain amount of time is required for assigning the application of the lending customer, and the lending customer cannot provide a service using the meta resource immediately after the return.

Figure 11:
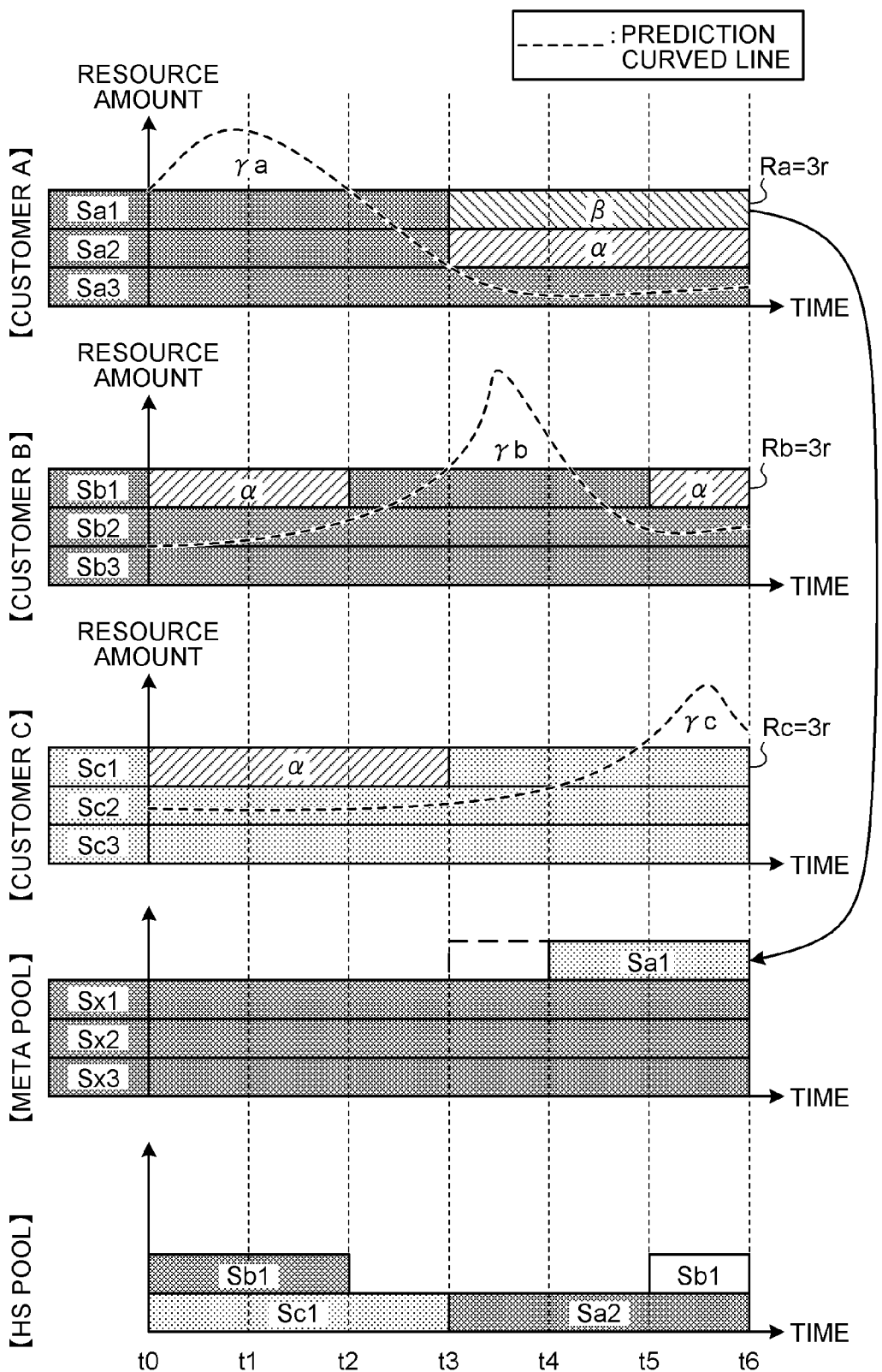
FIG. 11 is a diagram illustrating a demand prediction of each customer used in a second embodiment.
Figure 13:
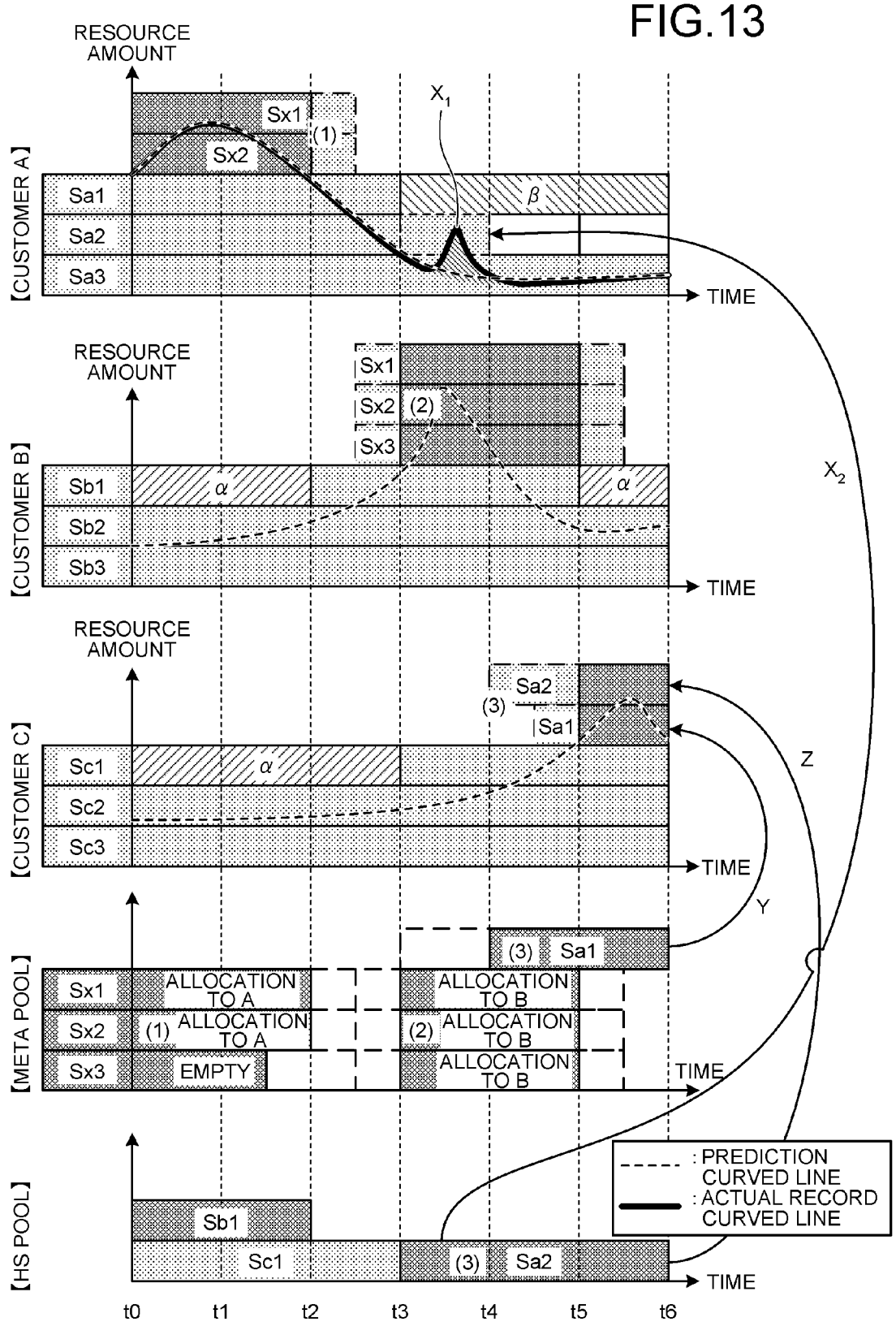
FIG. 13 is a diagram illustrating an example of resources allocated to each customer used in the second embodiment.
Figure 14:
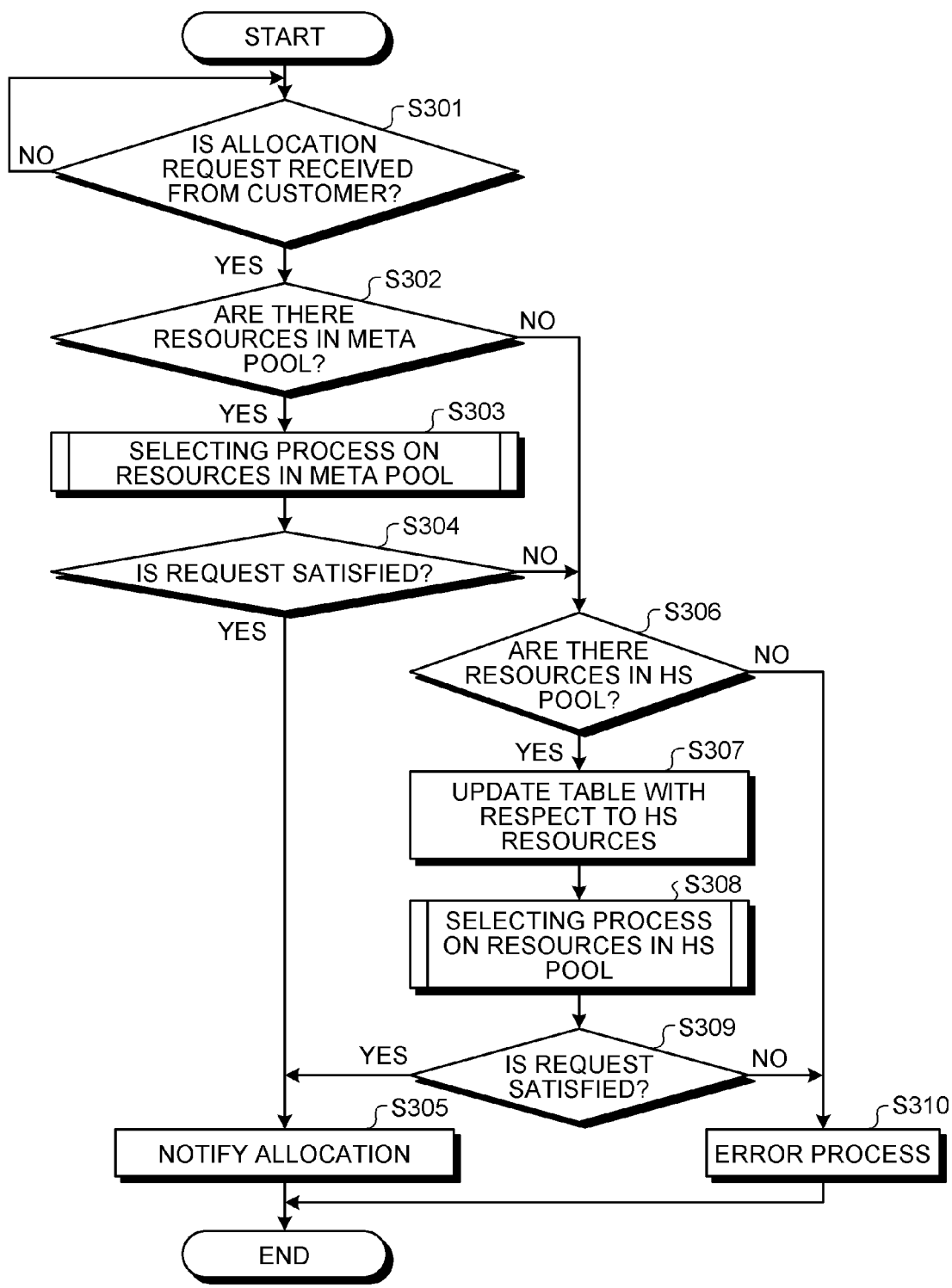
FIG. 14 is a flowchart illustrating a resource allocation determining process according to the second embodiment.
Figure 15:
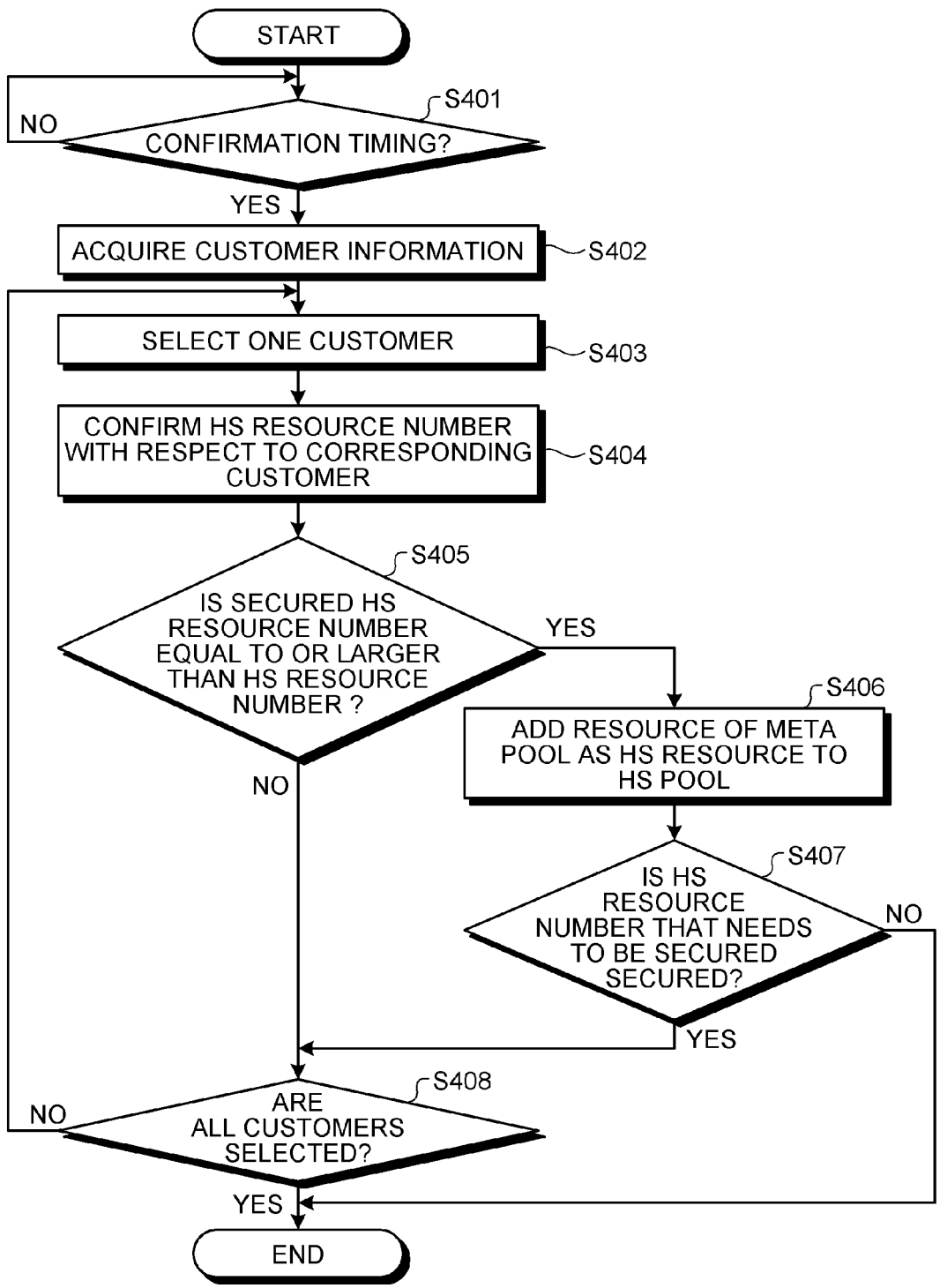
FIG. 15 is a flowchart illustrating a process based on a return resource receiving unit in the second embodiment.
Figure 16:
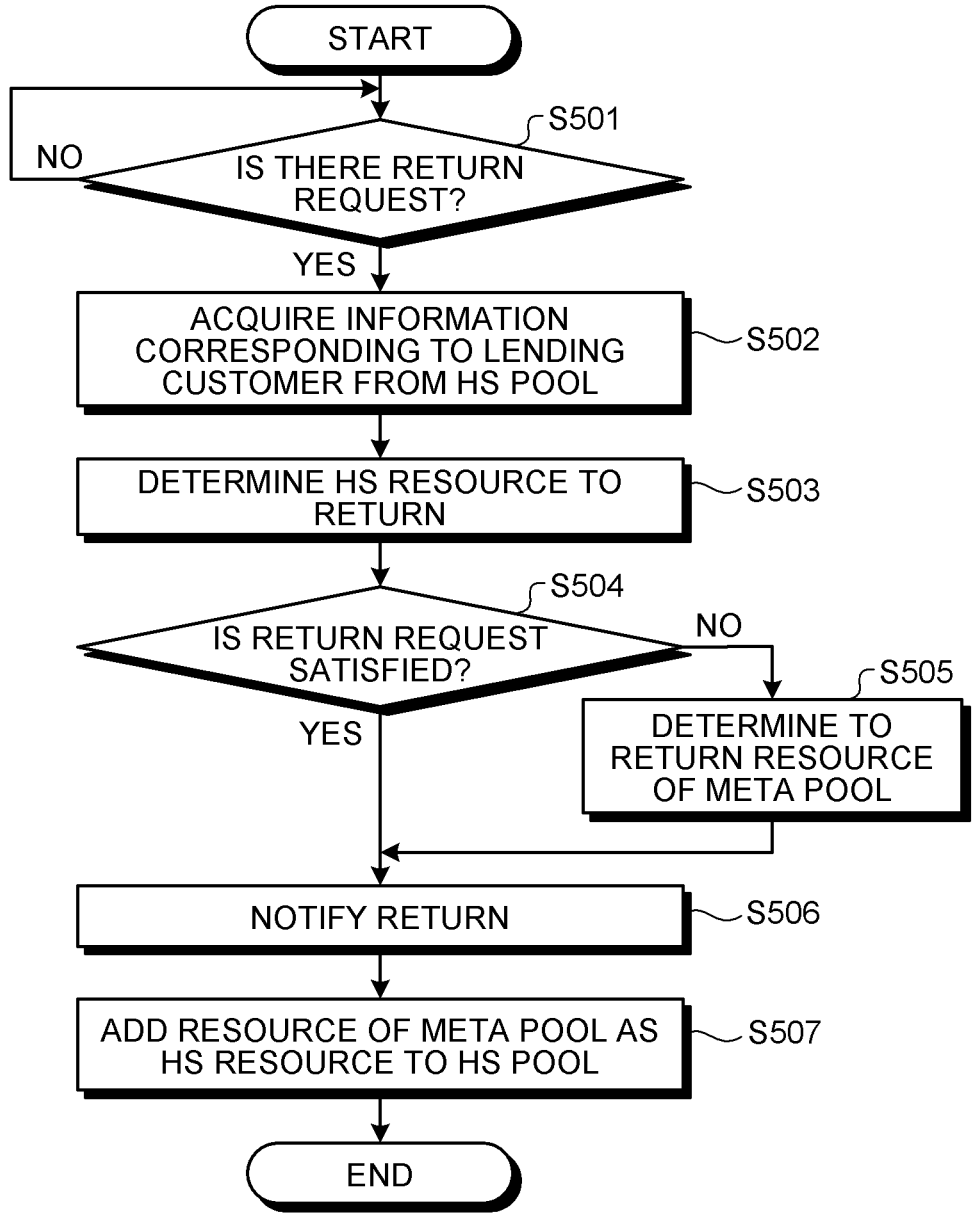
FIG. 16 is a flowchart illustrating a process performed by a return request handling unit according to the second embodiment.

Hereinafter, the second embodiment is described with reference to FIGS. 11 to 16. In the second embodiment, two types of remaining fixed resources, i.e., the HS resource and the meta resource, are distinguished from one another, and handled differently. The features common to the resource lending control apparatus 100 according to the first embodiment are not described or described briefly. FIG. 11 illustrates a demand prediction of each customer used in the second embodiment. FIG. 12 illustrates an allocation request from each customer used in the second embodiment. FIG. 13 illustrates an example of resources allocated to each customer used in the second embodiment. FIG. 14 is a flowchart illustrating a process performed by an allocation determining unit in the second embodiment. FIG. 15 is a flowchart illustrating a process performed by a return resource receiving unit in the second embodiment. FIG. 16 is a flowchart illustrating a process performed by a return request handling unit in the second embodiment.

Configuration of the Resource Lending Control Apparatus according to the Second Embodiment Specifically, in the resource lending control apparatus 100 according to the second embodiment, the server pool 200 includes the non-allocated resources, the HS resources, and the meta resources. Specifically, the server pool 200 has a meta pool that includes the non-allocated resources and the meta resources and an HS pool that includes the HS resources.

The customer information managing unit 301 stores the HS resources and the meta resources lent to the server pool 200 in association with each customer. The customer information managing unit 301 stores in advance in association with each customer, a "secured HS resource number" indicating the amount of resources to be secured as the HS resources among the resources lent from the customer, and also stores in association with each customer, an "HS resource number" indicating the amount of resources actually secured as the HS resources.

Here, the "secured HS resource number" indicates the amount of resources that the lending customer wants to secure as the HS resource and not as the meta resource when lending the remaining fixed resource to the server pool 200. As described above, the HS resources are handled in a state where the application of the lending customer is assigned. Therefore, as described later, when the lending customer needs to use the remaining fixed resource lent to the server pool 200 (for example, when an abrupt increase in demand of the resource amount occurs), the lending customer can start to provide its own service immediately after receiving the returned HS resource, using the HS resource. Thus, the "secured HS resource number" indicates in advance, the amount of resources to be secured for the lending customer as the HS resources (because the HS resources are useful for the lending customer (i.e., the resources which can be used immediately after the return)), with respect to the remaining fixed resources of the lending customer lent to the server pool.

When the customer system is to lend the remaining fixed resource, if the number of resources already lent to the server pool 200 is equal to or larger than the "secured HS resource number" stored in the customer information managing unit 301, the necessary resource determining unit 414 lends the remaining fixed resource to the server pool 200 as the meta resource. For example, the necessary resource determining unit 414 notifies the IDC managing unit 300 of pertinent information (for example, the "lendable time zone" managed by the resource managing unit 413 or the "lendable time" and the "lending end time", and information indicating that the remaining fixed resource are lent as the meta resource) through the customer-side communication unit 416.

On the other hand, when the customer system is to lend the remaining fixed resource and the number of resources already lent to the server pool 200 is smaller than the "secured HS resource number" stored in the customer information managing unit 301, the necessary resource determining unit 414 lends the remaining fixed resource to the server pool 200 as the HS resource. For example, the necessary resource determining unit 414 notifies the IDC managing unit 300 of pertinent information (for example, the "remaining start time" and the "lending end time" managed by the resource managing unit 413 and information indicating that the remaining fixed resource are lent as the HS resource) through the customer-side communication unit 416.

When the remaining fixed resource is lent as the HS resource to the server pool 200, the assignment executing unit 415 does not delete the previously assigned application. When the remaining fixed resource is lent as the meta resource, the assignment executing unit 415 deletes the previously assigned application. For example, when the number of resources already lent to the server pool 200 is equal to or larger than the "secured HS resource number" stored in the customer information managing unit 301, the assignment executing unit 415 deletes the previously assigned application of the lending customer from the resource newly lent to the server pool 200. When the number of resources already lent to the server pool 200 is smaller than the "secured HS resource number", the assignment executing unit 415 does not delete the previously assigned application of the lending customer.

If the assignment executing unit 415 receives an instruction from the return resource receiving unit 305, the return request handling unit 306, or the allocation executing unit 304 of the IDC managing unit 300 described later, the assignment executing unit 415 assigns the application to or deletes the application from the instructed resource. For example, when the HS resource that is lent from the HS pool to the borrowing customer is returned to the HS pool, and if the assignment executing unit 415 receives an instruction from the return resource receiving unit 305, the return request handling unit 306, or the allocation executing unit 304, the assignment executing unit 415 deletes the application of the lending customer from the instructed resource among the HS resources lent to the server pool (in other words, the assignment executing unit 415 turns the HS resource into the meta resource). For example, when the HS resource in the HS pool is lent to the borrowing customer, the assignment executing unit 415 assigns the application of the borrowing customer to the instructed resource among the meta resources lent to the server pool (in other words, the assignment executing unit 415 turns the meta resource into the HS resource). More specifically, when the HS resource is lent to other borrowing customer, the allocation executing unit 304 instructs the assignment executing unit 415 of the time when the application is to be deleted from the HS resource, and the assignment executing unit 415 deletes the application, which is assigned to the HS resource, of the borrowing customer from the HS resource at the instructed time.

The pool information managing unit 302 manages the non-allocated resources, the HS resources, and the meta resources.

For example, the pool information managing unit 302 stores the received "lending end time" of the HS resources. If the pool information managing unit 302 receives the request from the borrowing customer, the pool information managing unit 302 subtracts the stored deletion time of the borrowing customer with respect to the HS resources to calculate the lendable time, and updates the stored information. Specifically, if the pool information managing unit 302 receives the request from the borrowing customer and the allocation determining unit 303 determines whether the HS resource exists in the HS pool, the pool information managing unit 302 calculates the lendable time of the HS resource. The pool information managing unit 302 updates the "lending start time" with of the HS resource.

Further, the pool information managing unit 302 stores the "received lending start time" and "lending end time" with respect to the meta resource in association with each other, for example.

The lendable time zone of the HS resource will be described. As described above, the HS resource is handled in a state where the application of the lending customer is assigned, and the lendable time zone is different according to a point of time when the allocation request is received from the borrowing customer. For example, the case where the remaining start time is "t=2", the lending end time is "t=10", and the deletion time is "t=1" will be described. When the allocation request is received from the borrowing customer at a point of time of "t=2", the IDC managing unit 300 can start deleting the application of the lending customer at this point of time of "t=2", from the HS resource. Therefore, the lendable time is "t=3" and the lendable time zone is "t=3 to t=10".

On the other hand, if the allocation request is received from the borrowing customer at a point of time of "t=4", the application of the lending customer is assigned to the HS resource at this point of time of "t=4". The IDC managing unit 300 can starts deleting the application of the lending customer at the point of time of "t=4" at the earliest from the HS resource. Hence, the lendable time is "t=5" and the lendable time zone is "t=5 to t=10".

The allocation determining unit 303 determines whether the meta resource exists in the remaining fixed resources or not. On determining that there is a meta resource, the allocation determining unit 303 determines to lend the meta resource. On determining that there is no meta resource, the allocation determining unit 303 determines to lend the HS resource. Specifically, the allocation determining unit 303 determines to lend to the borrowing customer, the HS resource of the borrowing customer, the meta resource of the borrowing customer, the meta resource lent by other customer, the HS resource lent by other customer, or the non-allocated resource.

Next, the allocation determining unit 303 will be described using FIGS. 11 to 13. First, as illustrated in FIG. 11, the customer A uses the resources "Sa1", "Sa2", and "Sa3", the customer B uses the resources "Sb1", "Sb2", and "Sb3", the customer C uses the resources "Sc1", "Sc2", and "Sc3", and the meta pool includes the resources "Sx1", "Sx2", and "Sx3".

The demand prediction result of the resource requirement amount per unit time with respect to each of the customers A, B, and C of FIG. 11 is illustrated by a broken line. Using the demand prediction, the customers A, B, and C (for example, the necessary resource determining unit 414) lend the remaining fixed resources illustrated in α of FIG. 11 to the HS pool. Likewise, the customer A lends the remaining fixed resource illustrated in β of FIG. 11 to the meta pool. As illustrated in a dotted-line portion of the meta pool of FIG. 11, the resource "Sa1" of the customer A is lent to the meta pool for a time period except for the time period "t3 to t4" during which the application of the customer A is deleted.

As illustrated in γa, γb, and γc of FIG. 11, there is a time period for each of the customers A, B, and C during which it is predicted that the amount of resources will be insufficient. Thus, as illustrated in FIG. 12, the allocation determining unit 303 receives an allocation request for the resource corresponding to γa from the customer A, receives an allocation request for the resource corresponding to γb from the customer B, and receives an allocation request for the resource corresponding to γc from the customer C.

For example, as illustrated in FIG. 12, the allocation determining unit 303 receives the "resource amount" indicating the amount of resources whose allocation is requested and the "borrowing necessity time zone" from each customer. For example, as illustrated for ID "γa" in FIG. 12, the allocation determining unit 303 receives the borrowing necessity time zone "t=0 to t=2". FIG. 12 also illustrates the "deletion time", the "borrowing start time", the "borrowing end time", and the "total borrowing time" of the customer corresponding to the allocation request. Specifically, for the ID "γa" illustrated in FIG. 12 by way of example, the assignment time is "0.5t", the deletion time is "1t", the borrowing start time is "t0", the borrowing end time is "t2.5", and the total borrowing time zone is "2.5t".

Specifically, as illustrated in (1) of FIG. 13, the allocation determining unit 303 allocates the resource corresponding to the received allocation request from the meta pool and the HS pool to each of the customers A, B, and C. For example, the allocation determining unit 303 allocates the resources "Sx1" and "Sx2" of the meta pool to the customer A during the time zone of "t1 to t2.5" as illustrated in (1) of FIG. 13, allocates the resources "Sx1", "Sx2", and "Sx3" of the meta pool to the customer B during the time zone of "t2.5 to t5.5" as illustrated in (2) of FIG. 13, and allocates the resource "Sa1" of the meta pool to the customer C during the time zone of "t4 to t6" and the resource "Sa2" of the HS pool to the customer C during the time zone of "t4 to t6" as illustrated in (3) of FIG. 13.

With respect to the allocation determining unit 303, a further example will be described. For example, when the allocation determining unit 303 receives the allocation request from the customer, the allocation determining unit 303 determines whether the resources exist in the meta pool. In this case, when the resources exist in the meta pool, the allocation determining unit 303 executes a selecting process on the resources in the meta pool. For example, the selecting process (for example, steps S202 to S209 of FIG. 9) is executed by the allocation determining unit 303 according to the first embodiment. When the received allocation request is satisfied by the selecting process, the allocation determining unit 303 notifies the borrowing customer that the resource is allocated.

Meanwhile, when there is no resource in the meta pool and the received allocation request is not satisfied by the selecting process on the resources in the meta pool, the allocation determining unit 303 determines whether the resources exist in the HS pool.

When the information (for example, "lendable time") of the HS resources is updated by the return resource receiving unit 305 described later, the allocation determining unit 303 executes a selecting process on the resources in the HS pool. For example, the selecting process (for example, steps S202 to S209 of FIG. 9) is executed by the allocation determining unit 303 according to the first embodiment. When the received allocation request is satisfied, the allocation determining unit 303 notifies the borrowing customer that the resource is allocated. Meanwhile, when there is no resource in the HS pool and the received allocation request is not satisfied by the selecting process on the resources in the HS pool, the allocation determining unit 303 executes an error process. Specifically, the allocation determining unit 303 notifies the borrowing customer that the resources are not allocated thereto.

The return resource receiving unit 305 adds the resource returned from the borrowing customer as the HS resource to the HS pool or as the meta resource to the metal pool, based on the secured HS resource number set in advance by the customer information managing unit 301. Specifically, when the number of resources in the HS pool is equal to or larger than the secured HS resource number corresponding to the customer, to whom the resource returned from the borrowing customer has been allocated in advance, the return resource receiving unit 305 adds the returned resource as the meta resource to the meta pool. On the other hand, when the number of resources in the HS pool is smaller than the secured HS resource number corresponding to the customer, to whom the resource returned from the borrowing customer has been allocated in advance, the return resource receiving unit 305 adds the resource as the HS resource to the HS pool.

For example, when a confirmation timing comes, in other words, when a previously set regular timing comes, the return resource receiving unit 305 acquires customer information. The return resource receiving unit 305 acquires, for example, the "secured HS resource number" and the "HS resource number" with respect to each customer, from the customer information managing unit 301.

The return resource receiving unit 305 selects one customer from the customers and confirms the "HS resource number" with respect to the selected customer. Specifically, the return resource receiving unit 305 determines whether the "secured HS resource number" is equal to or larger than the "HS resource number". When it is determined that the "secured HS resource number" is equal to or larger than the "HS resource number", the return resource receiving unit 305 adds the resource in the meta pool to the HS pool as the HS resource. In other words, when the number of HS resources with respect to the customer (that is, HS resources where the application of the customer is assigned) does not reach the previously set "secured HS resource number", the return resource receiving unit 305 acquires the resource from the meta pool, assigns the application of the customer to the acquired resource (for example, the return server or the assignment executing unit 415 assigns the application), and adds the meta resource to the HS pool as the HS resource.

The return resource receiving unit 305 determines whether the secured HS resource number has been secured with the use of resource in the meta pool or not. Specifically, the return resource receiving unit 305 determines whether the "HS resource number" becomes equal to or larger than the "secured HS resource number" as a result of addition of the meta resource acquired from meta pool into the HS pool as the HS resource. When the resources of the secured HS resource number are secured with the use of the resource in the meta pool, the return resource receiving unit 305 determines whether all the customers have been selected. The return resource receiving unit 305 repeats the confirming process described above until all the customers are selected.

When the "secured HS resource number" is smaller than the HS resource number, in other words, when the number of HS resources of the corresponding customer is equal to or larger than the previously set "secured HS resource number", the return resource receiving unit 305 determines whether all the customers have been selected. The return resource receiving unit 305 repeats the confirming process described above until all the customers are selected.

In the above description of the example, the return resource receiving unit 305 starts the process, when the previously set regular timing, which is the confirmation timing, comes. However, the present invention is not limited thereto. For example, the return resource receiving unit 305 may confirm the "secured HS resource number" and the "HS resource number" with respect to the corresponding customer whenever the HS resource is returned to the lending customer and perform the above process. Alternatively, the return resource receiving unit 305 may perform the above process whenever the resource is returned from the borrowing customer.

When the customer who has remaining fixed resources among previously-allocated fixed resource (i.e., when there is a remaining fixed resource of the customer), and the customer wishes to use the remaining fixed resource, the return request handling unit 306 determines whether the remaining fixed resources include an HS resource or not. On determining that there is an HS resource, the return request handling unit 306 determines to use the HS resource. On the other hand, on determining that there is no HS resource, the return request handling unit 306 determines to use the meta resource. Note that the return request handling unit 306 may also be referred to as a "use determining unit", and serves to determine whether the remaining fixed resource includes the HS resource or not, and determine which resource to use accordingly.

Specifically, when there is an HS resource with respect to the lending customer, the return request handling unit 306 determines to return the HS resource. When there is no HS resource with respect to the lending customer, the return request handling unit 306 determines to return the meta resource.

An example is illustrated below with reference to FIG. 13. When the amount of resources actually required (solid line) becomes larger than the demand prediction result (broken line) of the resource requirement amount per unit time, the return request handling unit 306 receives the return request from the customer A, and returns the HS resource with respect to the customer A. When there is no HS resource with respect to the customer A, the return request handling unit 306 returns the meta resource. As represented by "$X_1$" of FIG. 13, when the actually needed resource amount becomes larger than the demand prediction result with respect to the customer A during the time zone of "t3 to t4", the return request handling unit 306 receives the return request from the customer A. As represented by "$X_2$" of FIG. 13, the return request handling unit 306 returns the resource "Sa2" corresponding to "t3 to t4". The resource "Sa2" in "t3 to t4" is a HS resource of the customer A and has not been allocated to other borrowing customer.

For example, when the return request handling unit 306 receives the return request from the lending customer, the return request handling unit 306 acquires the information related to the resources associated with the lending customer from the HS pool managed by the pool information managing unit 302. Specifically, the return request handling unit 306 acquires the amount of HS resources of the lending customer included in the HS pool, from the information stored in the pool information managing unit 302.

The return request handling unit 306 determines which HS resource to return. For example, the return request handling unit 306 determines which HS resource to return based on the contents of the return request (e.g., resource amount) and the amount of HS resources of the lending customer existing in the HS pool (for example, the return request handling unit 306 determines to return the HS resource that has a resource amount equal to or larger than the amount of return-requested resource and has the smallest resource amount difference).

The return request handling unit 306 determines whether the return request is satisfied. Specifically, the return request handling unit 306 determines whether the amount of HS resource which is determined to be returned can cover the amount of return-requested resource. On determining that the HS resource cannot cover the amount, the return request handling unit 306 determines to return the resource in the meta pool. In other words, the return request handling unit 306 returns the resource corresponding to the amount which cannot be covered by the HS resource to be returned but is requested by the lending customer from the meta resources.

When the return request handling unit 306 determines that the return request is satisfied, or when the return request handling unit 306 determines to return the resource in the meta pool, the return request handling unit 306 performs the return notification. For example, the return request handling unit 306 notifies the assignment executing unit 415 of the information related to the returned resource (for example, server name); the pool information managing unit 302 updates the information of the returned resources; and the customer information managing unit 301 updates the "HS resource number".

Then, the return request handling unit 306 adds the resource in the meta pool into the HS pool as the HS resource. Specifically, the return request handling unit 306 acquires the "secured HS resource number" and the "HS resource number" of the customer from the customer information managing unit 301, acquires the resource of the amount corresponding to the amount by which the "HS resource number" is smaller than the "secured HS resource number" from the meta pool, assigns the application of the customer to the acquired resource, and adds the meta resource to the HS pool as the HS resource, for example.

With Respect to the Resource Allocation Determining Process According to the Second Embodiment Next, the resource allocation determining process according to the second embodiment will be described using FIG. 14.

As illustrated in FIG. 14, when the allocation determining unit 303 receives the allocation request from the customer (step S301: YES), the allocation determining unit 303 determines whether there is a resource in the meta pool (step S302). On determining that there are resources in the meta pool (step S302: YES), the allocation determining unit 303 performs a selecting process on the resources in the meta pool (step S303). For example, the process of the allocation determining unit 303 according to the first embodiment (steps S202 to S209) is performed. When the received allocation request is satisfied by the selecting process (step S304: YES), the allocation determining unit 303 notifies the borrowing customer that the resource is allocated (step S305) and ends the process.

On the other hand, on determining that there is no resource in the meta pool (step S302: NO), or on determining that the received allocation request is not satisfied by the selecting process of the resources in the meta pool (step S304: NO), the allocation determining unit 303 determines whether there is resources in the HS pool (step S306).

When the allocation determining unit 303 determines that there are resources in the HS pool (step S306: YES), the pool information managing unit 302 calculates the lendable time with respect to the HS resources. The pool information managing unit 302 updates the "lending start time" with respect to the HS resources (step S307).

Next, the allocation determining unit 303 performs a selecting process on the resources in the HS pool (step S308). For example, the process of the allocation determining unit 303 according to the first embodiment (steps S202 to S209) is performed. When the received allocation request is satisfied (step S309: YES), the allocation determining unit 303 notifies the borrowing customer that the resource has been allocated (step S305) and ends the process.

Meanwhile, on determining that there is no resource in the HS pool (step S306: NO), or on determining that the received allocation request is not satisfied by the selecting process of the resources in the HS pool (step S309: NO), the allocation determining unit 303 performs an error process (step S310). That is, the allocation determining unit 303 notifies the borrowing customer that the resource has not been allocated. Then, the allocation determining unit 303 ends the process.

With respect to the Process of the Return Resource Receiving Unit in the Second Embodiment Next, a process performed by the return resource receiving unit in the second embodiment will be described using FIG. 15.

As illustrated in FIG. 15, when the confirmation timing comes (step S401: YES), in other words, when a previously set regular timing comes, the return resource receiving unit 305 acquires customer information (step S402). For example, the return resource receiving unit 305 acquires the "secured HS resource number" and the "HS resource number" with respect to each customer, from the customer information managing unit 301.

The return resource receiving unit 305 selects one customer from the customers (step S403) and confirms the "HS resource number" with respect to the selected customer (step S404). Then, the return resource receiving unit 305 determines whether the "secured HS resource number" is equal to or larger than the "HS resource number" (step S405). On determining that the "secured HS resource number" is equal to or larger than the "HS resource number" (step S405: YES), the return resource receiving unit 305 adds the resource of the meta pool to the HS pool as the HS resource (step S406). That is, when the number of the HS resources with respect to the customer (that is, HS resources where the application of the customer is assigned) does not reach the previously set "secured HS resource number", the return resource receiving unit 305 acquires the resource from the meta pool, assigns the application of the customer to the acquired resource (for example, the return server or the assignment executing unit 415 assigns the application), and adds the meta resource to the HS pool as the HS resource.

The return resource receiving unit 305 determines whether the secured HS resource number is secured with the use of the resource in the meta pool or not (step S407). In other words, the return resource receiving unit 305 determines whether the "HS resource number" becomes equal to or larger than the "secured HS resource number" with the addition of the meta resource acquired from the meta pool into the HS pool as the HS resource. On determining that the secured HS resource number is secured with the use of the resource in the meta pool (step S407: YES), the return resource receiving unit 305 further determines whether all the customers have been selected (step S408). The return resource receiving unit 305 repeats the confirming process (steps S403 to S407), when all the customers have not been selected (step S408: NO).

On determining that all the customers have been selected (step S408: YES), the return resource receiving unit 305 ends the process.

On determining that the "secured HS resource number" is smaller than the "HS resource number" (step S405: NO), that is, when the number of HS resources of the corresponding customer is equal to or larger than the previously set "secured HS resource number", the return resource receiving unit 305 further determines whether all the customers have been selected (step S408). On determining that all the customers have not been selected (step S408: NO), the return resource receiving unit 305 repeats the confirming process (steps S403 to S407). On determining that all the customers have been selected (step S408: YES), the return resource receiving unit 305 ends the process.

With respect to the Process Performed by the Return Request Handling Unit in the Second Embodiment Next, a process performed by the return request handling unit in the second embodiment will be described using FIG. 16.

As illustrated in FIG. 16, when the return request handling unit 306 receives the return request from the lending customer (step S501: YES), the return request handling unit 306 acquires the information related to resources associated with the lending customer, from the HS pool managed by the pool information managing unit 302 (step S502). For example, the return request handling unit 306 acquires the amount of HS resources of the lending customer included in the HS pool from the information stored in the pool information managing unit 302.

Then, the return request handling unit 306 determines which HS resource to return (step S503). For example, the return request handling unit 306 determines which HS resource to return based on the contents of the return request (for example, resource amount) and the amount of HS resources of the lending customer existing in the HS pool (for example, the return request handling unit 306 determines to return the HS resource which has the resource amount equal to or larger than the amount of return-requested resource and has the smallest resource amount difference).

The return request handling unit 306 determines whether the return request is satisfied (step S504). Specifically, the return request handling unit 306 determines whether the amount of return-requested resource is covered by the amount of HS resource determined to be returned. On determining that the amount of return-requested resource is not covered thereby (step S504: NO), the return request handling unit 306 determines to return the resource in the meta pool (step S505). Specifically, the return request handling unit 306 returns the meta resource to cover the amount of resource of the return-requested resource not covered by the HS resource which is determined to be returned.

On determining that the return request is satisfied (step S504: YES) or on determining to return the resource in the meta pool (step S505), the return request handling unit 306 performs the return notification (step S506). For example, the return request handling unit 306 notifies the assignment executing unit 415 of the information related to the returned resource (for example, server name); the pool information managing unit 302 updates the information of the returned resource; and the customer information managing unit 301 updates the "HS resource number".

Then, the return request handling unit 306 adds the resource in the meta pool into the HS pool as the HS resource (step S507). Specifically, the return request handling unit 306 acquires the "secured HS resource number" and the "HS resource number" of the customer from the customer information managing unit 301, acquires the resource of the amount corresponding to the amount by which the "HS resource number" is smaller than the "secured HS resource number" from the meta pool, assigns the application of the customer to the acquired resource, and adds the meta resource to the HS pool as the HS resource, for example. Then, the return request handling unit 306 ends the process.

Effect According to the Second Embodiment

As described above, according to the second embodiment, when the lending customer wishes to use the remaining fixed resource, the resource lending control apparatus determines whether the remaining fixed resources include HS resources or not. On determining that there is HS resource, the resource lending control apparatus determines to use the HS resource. On determining that there is no HS resource, the resource lending control apparatus determines to use the meta resource. Therefore, the resource lending control apparatus can deal with the abrupt resource return request from the customer who lends the remaining fixed resources (when the customer makes a request because of unpredictable, abrupt load increase).

In the conventional method, when the remaining fixed resource is to be returned, time is required for deleting the application assigned to the resource and for assigning the application used by the customer to whom the remaining fixed resource is previously allocated. Even when the customer who provides the remaining fixed resource needs to use the remaining fixed resource due to the abrupt generation of load and the like, the customer cannot use the remaining fixed resource immediately.

As compared with the conventional method, according to the present invention, the customer who provides the remaining fixed resource can use the HS resource to provide its own service immediately, as far as the HS resource has not been allocated to other borrowing customer.

According to the second embodiment, with respect to the HS resources, the resource lending control apparatus subtracts the deletion time and the assignment time of the lending customer from the remaining time zone and calculates the lendable period. With respect to the meta resources, the resource lending control apparatus subtracts the assignment time of the lending customer from the remaining time zone and calculates the lendable period. The resource lending control apparatus determines whether the remaining fixed resources include meta resources or not. On determining that there is a meta resource, the resource lending control apparatus determines to lend the meta resource. On determining that there is no meta resource, the resource lending control apparatus determines to lend the HS resource. Therefore, the resource lending control apparatus can allocate the resources appropriately.

Further, according to the present invention, the resource lending control apparatus can lend the remaining fixed resources to other borrowing customer in accordance with the status of resource utilization of each customer by utilizing two types of remaining fixed resources, i.e., the HS resource and the meta resource. To describe with a specific example, for a customer who is less likely to be suffered from an abrupt increase in demand of resources, the resource lending control apparatus treats most of the remaining fixed resources of this customer as the meta resources. On the other hand, for a customer who is highly likely to be suffered from an abrupt increase in demand of resources, the resource lending control apparatus treats most of the remaining fixed resources of this customer as the HS resources. Thus, the resource lending control apparatus can secure the resources (HS resources) which can be used to appropriately handle the changes in demands of the customers who have the remaining fixed resources, and at the same time, the resource lending control apparatus can utilize the resources as meta resources which can be lent to other resource-shortage customer immediately (because the deletion time is not required).

[c] Third Embodiment

The first and second embodiments have been described. In addition, a variety of different embodiments other than the first and second embodiments may be embodied. Accordingly, a different embodiment will be described as a resource lending control apparatus according to the third embodiment.

(1) With Respect to a Combination of the Embodiments

In the first embodiment, the determination on the resource lending is made in consideration of the assignment time and the deletion time, and such that the difference between the total borrowing time zone and the lendable time zone is minimal. The present invention, however, is not limited thereto. For example, it is possible to determine to lend the resources simply by considering the assignment time and the deletion time, and without considering the minimization of difference between the total borrowing time zone and the lendable time zone.

In the second embodiment, when the resource is to be lent, the meta resource is preferentially lent out, and the HS resource is returned. The present invention, however, is not limited thereto. For example, it is possible to only lend the meta resources preferentially; or to only return the HS resources. Alternatively, it is possible to preferentially lend out the meta resource and/or return the HS resources, while considering the assignment time and the deletion time, without considering the minimization of difference between the total borrowing time zone and the lendable time zone.

(2) Configuration of a System

Among the individual processes described in the embodiments, all or a portion of the processes that are described as being automatically executed may be manually executed. For example, the borrowing necessity time zone may be manually transmitted to the IDC managing unit. In addition, the process sequence, the control sequence, the specific names, and the information including the various data or parameters illustrated in the specification and the drawings (for example, FIGS. 2, 4, and 6 to 17) may be arbitrarily changed, if not otherwise specified.

The components of the individual devices that are illustrated in the drawings are functional and conceptual, and do not need to have the physical configuration as illustrated in the drawings. That is, the specific forms of integration and separation of the individual devices are not limited to the forms illustrated in the drawings, and all or a portion thereof may be functionally or physically integrated or separated in an arbitrary unit according to various loads or use situations. To explain using the example illustrated in FIG. 5, the customer system 400 and the IDC managing unit 300 may be integrated with each other, and the customer system 400 and the server pool 200 may be separated from the resource lending control apparatus 100.

(3) Program

Figure 17:
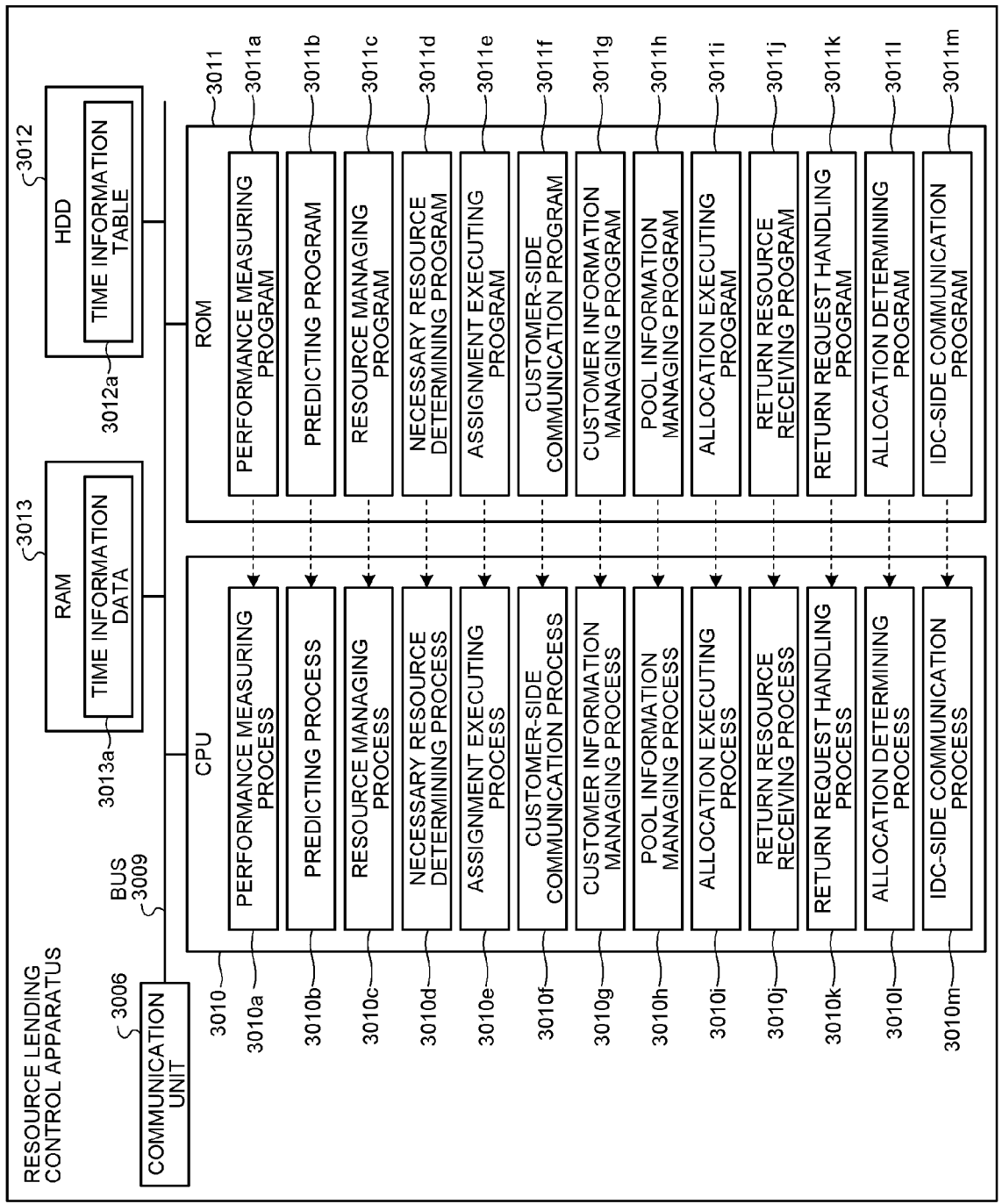
FIG. 17 is a diagram illustrating a program of the resource lending control apparatus according to the first embodiment.
Figure 18:
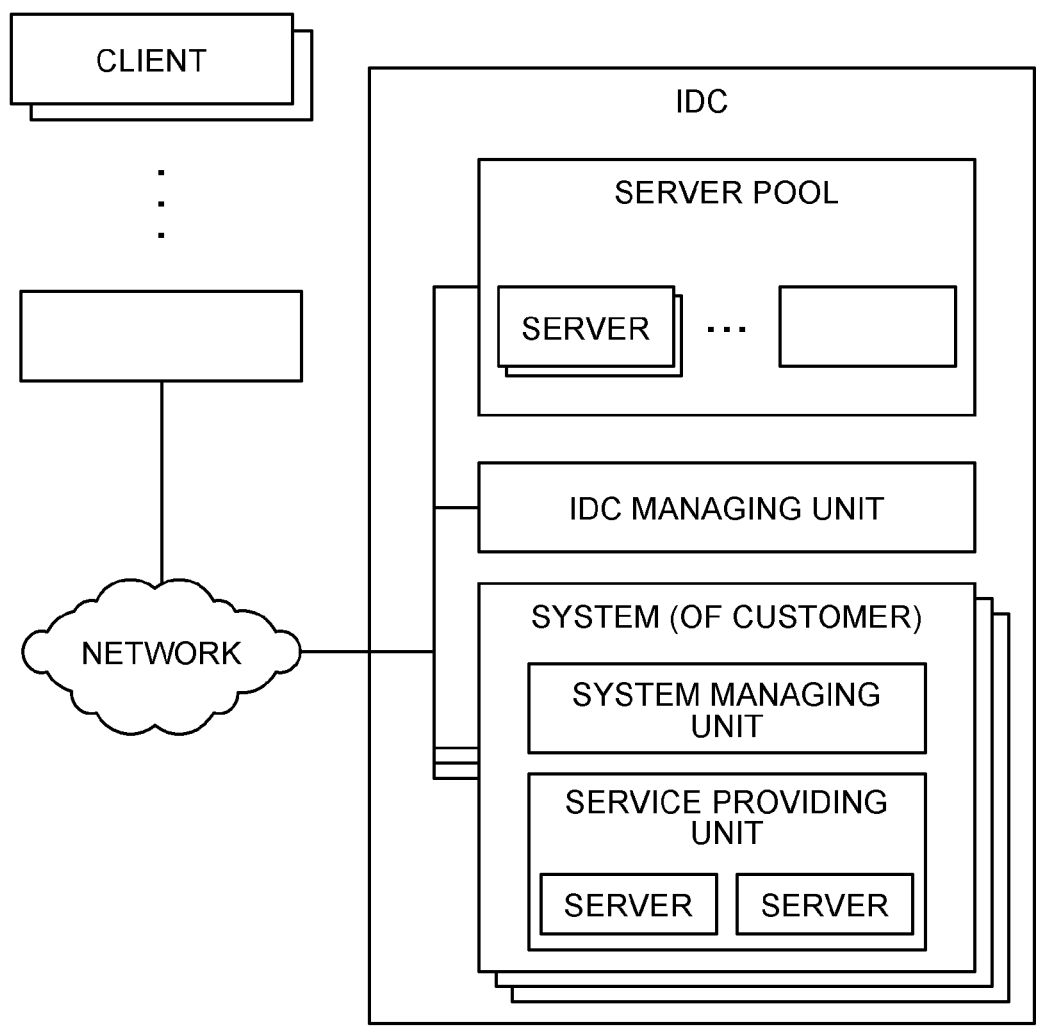
FIG. 18 is a diagram illustrating a conventional resource lending control apparatus.

In the first embodiment, the various processes are realized by hardware logic. The present invention is not limited thereto. For example, the various processes may be realized by causing a computer to execute a prepared program. In the following, an example of a computer that executes a resource lending control program having the same function as that of the resource lending control apparatus according to the first embodiment will be described using FIG. 17. FIG. 17 illustrates a program of the resource lending control apparatus according to the first embodiment.

As illustrated in FIG. 17, a resource lending control program according to the third embodiment includes a communication unit 3006, a CPU 3010, a ROM 3011, an HDD 3012, and a RAM 3013, and a bus 3009 which connects these elements with each other.

The ROM 3011 stores control program that realizes the same functions as those of the performance measuring unit 411, the predicting unit 412, the resource managing unit 413, the necessary resource determining unit 414, the assignment executing unit 415, the customer-side communication unit 416, the customer information managing unit 301, the pool information managing unit 302, the allocation executing unit 304, the return resource receiving unit 305, the return request handling unit 306, the allocation determining unit 303, and the IDC-side communication unit 307 described in the first embodiment. Specifically, the ROM 3011 stores therein in advance, a performance measuring program 3011$a$, a predicting program 3011$b$, a resource managing program 3011$c$, a necessary resource determining program 3011$d$, an assignment executing program 3011$e$, a customer-side communication program 3011$f$, a customer information managing program 3011$g$, a pool information managing program 3011$h$, an allocation executing program 3011$i$, a return resource receiving program 3011$j$, a return request handling program 3011$k$, an allocation determining program 3011$l$, and an IDC-side communication program 3011$m$, as illustrated in FIG. 17. The programs 3011$a$ to 3011$m$ may be appropriately integrated or separated, similarly to the components of the resource lending control apparatus illustrated in FIG. 4.

If the CPU 3010 reads the programs 3011$a$ to 3011$m$ from the ROM 3011 and executes the programs, the programs 3011$a$ to 3011$m$ function as a performance measuring process 3010$a$, a predicting process 3010$b$, a resource managing process 3010$c$, a necessary resource determining process 3010$d$, an assignment executing process 3010$e$, a customer-side communication process 3010$f$, a customer information managing process 3010$g$, a pool information managing process 3010$h$, an allocation executing process 3010$i$, a return resource receiving process 3010$j$, a return request handling process 3010$k$, an allocation determining process 30101, and an IDC-side communication process 3010$m$, respectively, as illustrated in FIG. 17. The processes 3010$a$ to 3010$m$ correspond to the performance measuring unit 411, the predicting unit 412, the resource managing unit 413, the necessary resource determining unit 414, the assignment executing unit 415, the customer-side communication unit 416, the customer information managing unit 301, the pool information managing unit 302, the allocation executing unit 304, the return resource receiving unit 305, the return request handling unit 306, the allocation determining unit 303, and the IDC-side communication unit 307, which are illustrated in FIG. 4.

The HDD 3012 is provided with a time information table 3012$a$. The time information table 3012$a$ corresponds to the resource managing unit 413 or the customer information managing unit 301 illustrated in FIG. 4.

The CPU 3010 reads time information from the time information table 3012$a$ and stores the time information in the RAM 3013, and executes the resource lending control program using time information data 3013$a$ stored in the RAM 3013.

(4) Other

The resource lending control apparatus described in the embodiments can be realized by executing a prepared program by a computer, such as a personal computer or a workstation. The program may be distributed through a network, such as the Internet. The program may be recorded in a computer readable recording medium, such a hard disk, a flexible disk (FD), a CD-ROM, a MO, and a DVD, and may be read from the recording medium by the computer and be executed.

The resource lending control apparatus of the embodiment can appropriately allocate the resources.

Further, the resource lending control apparatus of the embodiment can efficiently allocate the resources.

The resource lending control apparatus of the embodiment can handle an abrupt resource request from a customer having the remaining fixed resources.

The resource lending control apparatus of the embodiment can appropriately allocate the resources.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for controlling lending of a remaining resource of one customer to another customer, the remaining resource being a resource of a server and being allocated to one customer and not used in a service provided by the one customer, the apparatus comprising:
    a time information storage unit that stores a pre-lending deletion time period and a post-lending assignment time period of a lending customer and a pre-use assignment time period and a post-use deletion time period of a borrowing customer, the pre-lending deletion time period being a time period for the lending customer's deleting a first application from the server, the post-lending assignment time period being a time period for the lending customer's assigning the first application to the server, the pre-use assignment time period being a time period for the borrowing customer's assigning a second application to the server, the post-use deletion time period being a time period for the borrowing customer's deleting the second application from the server; and
    a lending determining unit that determines whether a total borrowing period of the borrowing customer is covered by a lendable period of the remaining resource of the lending customer to determine whether to lend the remaining resource to the borrowing customer, wherein
    the lendable period is calculated by subtracting, from a remaining time zone during which the remaining resource of the lending customer is not used in a service provided by the lending customer, the pre-lending deletion time period which is prior to the lendable period and the post-lending assignment time period which is posterior to the lendable period, and
    the total borrowing period includes a borrowing necessity time zone during which the remaining resource of the lending customer is used in a service provided by the borrowing customer, the pre-use assignment time period which is prior to the borrowing necessity time zone and the post-use deletion time period which is posterior to the borrowing necessity time zone, wherein
    the remaining resource is either a hot-standby remaining resource or a meta remaining resource, the hot-standby remaining resource being a resource in a state where the application used by the lending customer to whom the resource is allocated has been assigned, the meta remaining resource being a resource in a state where the application used by the lending customer to whom the resource is allocated has been deleted,
    the apparatus further comprises a returning unit that determines to return more preferentially the hot-standby remaining resource than the meta remaining resource to the lending customer when the lending customer uses the remaining resource, and
    the lending determining unit determines to lend more preferentially the meta remaining resource than the hot-standby remaining resource.

2. The apparatus according to claim 1, wherein the lending determining unit determines, in addition to determining whether the total borrowing period is covered by the lendable period or not, which remaining resource among the remaining resources whose lendable period is determined to cover the total borrowing period has a minimum difference between the lendable period and the total borrowing period, to determine to lend the remaining resource.

3. A method for controlling lending of a remaining resource of one customer to another customer, the remaining resource being a resource of a server and being allocated to one customer and not used in a service provided by the one customer, the method comprising:
    first determining whether a total borrowing period of a borrowing customer is covered by a lendable period of the remaining resource of a lending customer to determine whether to lend the remaining resource to the borrowing customer, wherein
    the lendable period is calculated by subtracting, a remaining time zone during which a remaining resource of a lending customer is not used in a service provided by the lending customer, a pre-lending deletion time period which is prior to the lendable period and a post-lending assignment time period which is posterior to the lendable period, the post-lending assignment time period being a time period for the lending customer's assigning a first application to the server, the pre-lending deletion time period being a time period for the lending customer's deleting a first application from the server,
    the total borrowing period includes a borrowing necessity time zone during which the remaining resource of the lending customer is used in a service provided by a borrowing customer, a pre-use assignment time period which is prior to the borrowing necessity time zone and a post-use deletion time period which is posterior to the borrowing necessity time zone, the pre-use assignment time period being a time period for the borrowing customer's assigning a second application to the server, the post-use deletion time period being a time period for the borrowing customer's deleting the second application from the server, wherein
    the remaining resource is either a hot-standby remaining resource or a meta remaining resource, the hot-standby remaining resource being a resource in a state where the application used by the lending customer to whom the resource is allocated has been assigned, the meta remaining resource being a resource in a state where the application used by the lending customer to whom the resource is allocated has been deleted, the method further comprises second determining to return more preferentially the hot-standby remaining resource than the meta remaining resource to the lending customer when the lending customer uses the remaining resource, and the first determining includes determining to lend more preferentially the meta remaining resource than the hot-standby remaining resource.

4. The method according to claim 3, wherein the first determining includes determining, in addition to determining whether the total borrowing period is covered by the lendable period or not, which remaining resource among the remaining resources whose lendable period is determined to cover the total borrowing period has a minimum difference between the lendable period and the total borrowing period, to determine to lend the remaining resource.

5. A non-transitory computer readable storage medium having stored therein a resource lending program for controlling lending of a remaining resource of one customer to another customer, the remaining resource being a resource of a server and being allocated to one customer and not used in a service provided by the one customer, the resource lending program causing a computer to execute a process comprising:

first determining whether a total borrowing period of a borrowing customer is covered by a lendable period of the remaining resource of a lending customer to determine whether to lend the remaining resource to the borrowing customer, wherein the lendable period is calculated by subtracting, from a remaining time zone during which a remaining resource of a lending customer is not used in a service provided by the lending customer, a pre-lending deletion time period which is prior to the lendable period and a post-lending assignment time period which is posterior to the lendable period, the post-lending assignment time period being a time period for the lending customer's assigning a first application to the server, the pre-lending deletion time period being a time period for the lending customer's deleting a first application from the server, the total borrowing period includes a borrowing necessity time zone during which the remaining resource of the lending customer is used in a service provided by a borrowing customer, a pre-use assignment time period which is prior to the borrowing necessity time zone and a post-use deletion time period which is posterior to the borrowing necessity time zone, the pre-use assignment time period being a time period for the borrowing customer's assigning a second application to the server, the post-use deletion time period being a time period for the borrowing customer's deleting the second application from the server, wherein the remaining resource is either a hot-standby remaining resource or a meta remaining resource, the hot-standby remaining resource being a resource in a state where the application used by the lending customer to whom the resource is allocated has been assigned, the meta remaining resource being a resource in a state where the application used by the lending customer to whom the resource is allocated has been deleted, the process further comprises second determining to return more preferentially the hot-standby remaining resource than the meta remaining resource to the lending customer when the lending customer uses the remaining resource, and the first determining includes determining to lend more preferentially the meta remaining resource than the hot-standby remaining resource.

6. The medium according to claim 5, wherein the first determining includes determining, in addition to determining whether the total borrowing period is covered by the lendable period or not, which remaining resource among the remaining resources whose lendable period is determined to cover the total borrowing period has a minimum difference between the lendable period and the total borrowing period, to determine to lend the remaining resource.

* * * * *